(12) United States Patent
Eaton

(10) Patent No.: US 8,723,470 B2
(45) Date of Patent: May 13, 2014

(54) SYSTEM AND METHOD FOR DETERMINING POSITION OF HALL SENSORS RELATIVE TO STATOR WINDING OF BRUSHLESS DC OR SYNCHRONOUS AC PERMANENT MAGNET MOTOR

(75) Inventor: Harry A. Eaton, Columbia, MD (US)

(73) Assignee: The Johns Hopkins University, Baltimore, MD (US)

(*) Notice: Subject to any disclaimer, the term of this patent is extended or adjusted under 35 U.S.C. 154(b) by 322 days.

(21) Appl. No.: 13/249,739

(22) Filed: Sep. 30, 2011

(65) Prior Publication Data

US 2013/0082633 A1 Apr. 4, 2013

(51) Int. Cl.
*G01R 31/02* (2006.01)
(52) U.S. Cl.
USPC ............ 318/490; 318/400.06; 318/701

(58) Field of Classification Search
USPC .......... 318/490, 400.06, 701, 400.13, 400.39, 318/720, 721, 722, 432
See application file for complete search history.

(56) References Cited

U.S. PATENT DOCUMENTS

| | | |
|---|---|---|
| 3,867,656 A | 2/1975 | Mitsui et al. |
| 6,836,090 B2 | 12/2004 | Sugiyama et al. |
| 6,969,962 B2 | 11/2005 | Oe |
| 7,663,274 B2 | 2/2010 | Kataoka et al. |
| 2008/0180046 A1 | 7/2008 | D'Angelo et al. |
| 2010/0090633 A1 | 4/2010 | Deller et al. |
| 2013/0138300 A1* | 5/2013 | Hayama ..................... 701/43 |

* cited by examiner

*Primary Examiner* — Karen Masih
(74) *Attorney, Agent, or Firm* — Aisha Ahmad

(57) ABSTRACT

A method is provided for monitoring a motor having a stator, a rotor and a detector. The stator can receive a driving signal to produce a first magnetic field. The rotor can rotate in a circle relative to the stator. The rotor has a magnetic portion that can emit a second magnetic field in a radial direction. The detector can output a detection signal based on the position of the rotor.

19 Claims, 11 Drawing Sheets

US 8,723,470 B2

SYSTEM AND METHOD FOR DETERMINING POSITION OF HALL SENSORS RELATIVE TO STATOR WINDING OF BRUSHLESS DC OR SYNCHRONOUS AC PERMANENT MAGNET MOTOR

STATEMENT OF GOVERNMENT INTEREST

This invention was made with U.S. Government support under the Defense Advanced Research Projects Agency under contract number N66001-06-C-8005. The U.S. Government has certain rights in the invention.

BACKGROUND

Multi-phase electric power is a common method for providing alternating current for power generation, transmission and distribution. For example, in three-phase systems, three circuit conductors transmit three alternating currents of the same frequency and differing phase. For a particular phase, the alternating currents of the other two phases are shifted in time by one-third and two-thirds of a cycle, respectively. The differing in the phases of the three alternating currents enables constant transfer of power to a load.

Multi-phase electric power provides efficient transfer of power to multi-phase motors. In general, a multi-phase motor includes a stator (i.e. stationary portion) and multiple rotors (i.e. rotating portion) or includes multiple stators and a rotor. Multi-phase electrical power applied to a multi-phase motor results in current flow traversing the multiple stators of the motor. The current flow traversing the multiple stators results in a magnetic field, which produces magnetic torque on the rotor. The magnetic torque applied to the rotor results in rotation of the rotor.

Some conventional multi-phase motor implementations use rotor location information received from sensors for generating necessary signals for controlling multi-phase motors. Other conventional multi-phase motor implementations use detection of zero voltage crossing points associated with Back Electro Motive Force (BEMF).

FIGS. 1A-F are cross-sectional illustrations for an example motor 100.

Motor 100 is a multi-phase motor and includes a stator 102 and a rotor 104. Motor 100 operates as a three-phase motor for converting electrical power to mechanical power. For this example, rotor 104 is located interior to stator 102. Rotor 104 rotates within stator 102, with stator 102 being stationary. Rotor 104 includes a magnet 106, a magnet 107, a magnet 108, a magnet 109, a magnet 110 and a magnet 111. Magnets 106, 107, 108, 109, 110 and 111 provide magnetic fields. Stator 102 includes a first leg 112, a second leg 114 and a third leg 116. Legs 112, 114 and 116 provide magnetic fields. The interoperation of magnets 106, 107, 108, 109, 110 and 111 with legs 112, 114 and 116 cause rotor 104 to rotate within stator 102.

For discussion with respect to FIGS. 1A-F, consider rotor 104 rotating in a clockwise direction.

In FIG. 1A, magnet 106 is located with respect to first leg 112 by an angle 120 also denoted as θ. At this time of the revolution of rotor 104, magnet 106 has not yet reached first leg 112.

In FIG. 1B, rotor 104 has rotated such that magnet 106 has passed first leg 112 by angle 120.

In FIG. 1C, magnet 106 is lagging with respect to second leg 114 by angle 120. At this time of the revolution of rotor 104, magnet 106 has not passed second leg 114.

In FIG. 1D, magnet 106 has passed second leg 114 by angle 120.

In FIG. 1E, rotor 104 has rotated such that magnet 106 is lagging with respect to third leg 116 by angle 120. At this time of the revolution of rotor 104, magnet 106 has not passed third leg 116.

In FIG. 1F, magnet 106 has passed third leg 116 by angle 120.

To efficiently drive motor 100, the relative position of rotor 104 with respect to stator 102 should be known. This may be accomplished by monitoring the relative location of a single point on rotor 104 with respect to stator 102. For purposes of discussion, consider a point 118 on rotor 104. Knowing the location of point 118, with respect to stator 102, enables the determination of the location of all other points on rotor 104 with respect to stator 102. Furthermore, determining the location of point 118 with respect to stator 102 may aid in controlling the operation of motor 100. In particular, motor 100 may be driven differently for the configuration of FIG. 1A than for the configuration in any one of FIGS. 1B-F.

FIGS. 2A-F are cross-sectional illustrations for example conventional motor 100 at different times of operation.

For purposes of discussion, consider the configuration of motor 100 of FIG. 2A, wherein rotor 104 is rotating with an angular velocity, as noted by arrow 204, within stator 102. At some time, the polarity of the magnetic field provided by stator 102 should be opposite to that of the magnetic field provided by rotor 104 so as to "pull" rotor 104 toward stator 102. In this example, magnet 106 is arranged so as to provide a negative magnetic field radially outward toward stator 102. At this time, first leg 112 is driven so as to provide a positive magnetic field radially inward toward rotor 104. An attraction, as noted by an arrow 202, results from the opposite magnetic fields presented by magnet 106 and first leg 112. The attraction indicated by arrow 202 induces rotation of rotor 104 at the angular velocity, as noted by arrow 204.

Rotor 104 will continue to rotate in a clockwise direction, as shown in FIG. 2B. Similar to FIG. 2A, in FIG. 2B magnet 106 is still arranged so as to provide a negative magnetic field radially outward toward stator 102. At this time, first leg 112 is still driven so as to provide a positive magnetic field radially inward toward rotor 104. An attraction, from the opposite magnetic fields presented by magnet 106 and first leg 112, is maintained. The maintained attraction maintains rotation of rotor 104 at an angular velocity, as noted by an arrow 206.

At some time, the polarity of the magnetic field provided by stator 102 should be reversed to "push" rotor 104 away from stator 102. As shown in FIG. 2C, the polarity of the magnetic field provided by first leg 112 has switched from a positive magnetic field as described with reference to FIG. 2A-B to a negative magnetic field. In other words in FIG. 2C, magnet 106 is still arranged so as to provide a negative magnetic field radially outward toward stator 102. However, first leg 112 is driven so as to provide a negative magnetic field radially inward toward rotor 104. The similar magnetic fields provided by first leg 112 and magnet 106 create a repulsion, as noted by an arrow 208. Repulsion 208 maintains rotation of rotor 104 at an angular velocity, as noted by an arrow 210.

Rotor 104 will continue to rotate in a clockwise direction, as shown in FIG. 2D. Similar to FIG. 2C, in FIG. 2D magnet 106 is still arranged so as to provide a negative magnetic field radially outward toward stator 102. At this time, first leg 112 is still driven so as to provide a negative magnetic field radially inward toward rotor 104. A repulsion, from the similar magnetic fields presented by magnet 106 and first leg 112, is maintained. The maintained repulsion maintains rotation of rotor 104 at an angular velocity, as noted by an arrow 212.

For proper operation of motor 100, switching the polarity of the magnetic field provided by first leg 112, for example as described above with respect to FIG. 2C, must be performed at an appropriate time, i.e., at the correct relative position of rotor 104 with respect to stator 102. Accordingly, appropriate switching of magnetic field for first leg 112 requires an accurate determination of the location and velocity for rotor 104 with respect to stator 102.

FIG. 2E illustrates an example of improper timing of the switching of the polarity of the magnetic field provided by first leg 112. In FIG. 2E, rotor is rotating in a clockwise direction at an angular velocity, as noted by an arrow 216. First leg 112 is driven to provide a radially inward negative magnetic field. Because first leg 112 is driven in this manner at this time, the radially inward negative magnetic field provided by first leg 112 repels against the radially inward negative magnetic field provided by magnet 106. The repelling similar magnetic fields results in a repulsion, illustrated by arrow 214, between first leg 112 and magnet 106. In this example, the relative location of rotor 104 with respect to stator 102 may have been incorrectly ascertained resulting in the configuration of the magnetic field for first leg 112 being switched at an incorrect point in time, resulting in an unpredictable operation of motor 100

As shown in FIG. 2F the repulsion, illustrated by arrow 214, between first leg 112 and magnet 106 may result in the undesired termination of rotation for rotor 104.

FIGS. 2A-F illustrate the importance of accurately determining the position and velocity of rotor 104 (relative to stator 102) associated with the operation for a three-phase motor. As the accuracy of the relative position and velocity increases, the more efficiently the three-phase motor may be operated.

FIG. 3 illustrates an example cross-section timing selection diagram for determining the position of rotor 104 with respect to stator 102.

For example, a position 302 is the position of point 118 on rotor 104 at time $t_1$ as shown in FIG. 1A, a position 304 is the position of point 118 on rotor 104 at time $t_2$ as shown in FIG. 1B, a position 306 is the position of point 118 on rotor 104 at time $t_3$ as shown in FIG. 1C, a position 308 is the position of point 118 on rotor 104 at time $t_4$ as shown in FIG. 1D, a position 310 is the position of point 118 on rotor 104 at time $t_5$ as shown in FIG. 1E and a position 312 is the position of point 118 on rotor 104 at time $t_6$ as shown in FIG. 1F.

Control of motor 100 may require determining the location of rotor 104 with respect to stator 102, for example by determining the location of point 118, at various points in time in order to efficiently and properly drive motor 100. An incorrect determination for the location of point 118 may result in inefficient and improper operation of motor 100. For example, if driven improperly, the magnetic fields associated with rotor 104 and stator 102 may repel one another as discussed above with reference to FIG. 2E or rotor 104 may cease rotating as discussed above with reference to FIG. 2F.

There are many known systems and methods for determining the position and velocity of a rotor, with reference to a stator, in a multi-phase motor. Many deal with detecting the BEMF. However, to detect the BEMF, additional circuitry is required.

What is needed is a system and method for determining the position and velocity of a rotor, with reference to a stator, without relying on the BEMF.

BRIEF SUMMARY

The present invention provides a system and method for determining the position and velocity of a rotor, with reference to a stator, without relying on the BEMF.

In accordance with an aspect of the present invention, a method is provided for monitoring a motor having a stator, a rotor and a detector. The stator can receive a driving signal to produce a first magnetic field. The rotor can rotate in a circle relative to the stator. The rotor has a magnetic portion that can emit a second magnetic field in a radial direction. The detector can output a detection signal based on the position of the rotor. The method includes: driving the motor with the driving signal such that the driving signal has a first amplitude; monitoring the detection signal; determining a first rotor angle $\theta_1$ of the rotor relative to the stator based on the driving signal having the first amplitude and the detection signal; driving the motor with the driving signal such that the driving signal has a second amplitude; monitoring the detection signal; determining a second rotor angle $\theta_2$ of the rotor relative to the stator based on the driving signal having the second amplitude and the detection signal; and determining the alignment of the detector relative to the stator based on the first rotor angle $\theta_1$ and the second rotor angle $\theta_2$.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figures 1A, 1B:
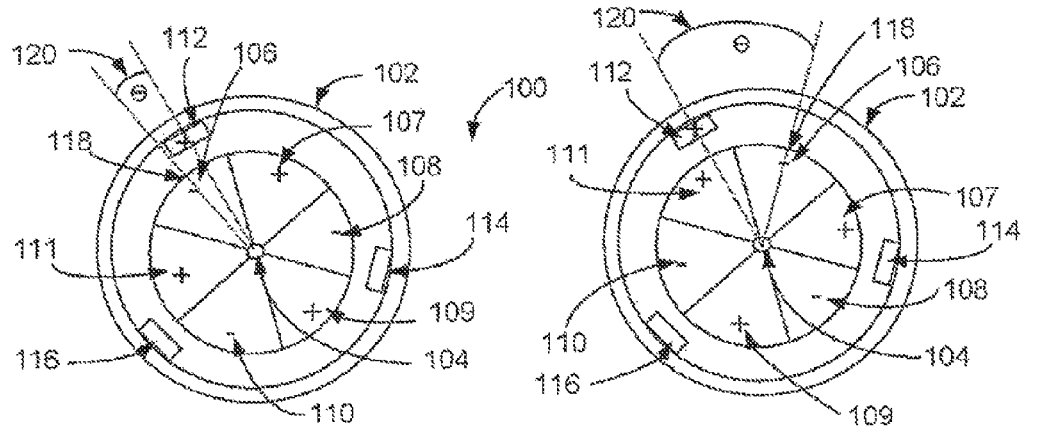
FIGS. 1A-F are cross-sectional illustrations for an example conventional motor.

In accordance with aspects of the present invention, with a motor having motor position sensors, a system is operable to determine the sensor alignment(s) by driving the motor and does not observe the back-EMF. It therefore has no need for the necessity of being able to disconnect the drive signal, nor have the inputs to measure the back-EMF.

Consider a motor having hall sensors thereon for detecting a relative position of the stator(s) and rotor. Further, consider this motor being driven open-loop, i.e., the voltage waveform causes the magnetic field in the stator to spin in a slow circle without regard to the stator position (this is just a steady-state 3-phase sine wave). It is trivial to do this because the motor controller normally spins the field synchronous to the rotor based on its position. To operate open-loop, it is simply spun in time. There is nothing new or unique about driving a motor open loop. During the open-loop drive, the torque on the rotor is the cross-product between the stator field and the magnetic moment of the permanent magnet. This torque is maximum when the two are at right angles. If the open-loop drive is considerably stronger than needed to overcome the mechanical load on the motor, the rotor will follow behind the rotating field at an angle smaller than 90°. As the rotor spins, it causes the hall sensors to change states. The angle between the rotating field and the rotor is unknown because the precise torque is unknown.

The invention is to solve for this unknown by driving the motor with two different field strengths, but at the same rotation rate. The mechanical torque should be the same between the two conditions because the mechanical rotation is the same. For the stronger field, the angle between rotor and stator will be smaller than for the weaker field. It is possible to analytically solve for the rotor angle from the two measurements.

Consider the instant of time when a particular hall sensor transitions from high to low. This occurs at an unknown rotor angle $\theta_m$. The field leads it by an unknown angle, but the absolute angle of the field is known because the controller is generating it. The torque is simply the product of drive strength, and a motor constant times the sine of the angle between the two.

It is most convenient to simply use the angle of the drive voltage, which is just the phase of the sinusoidal drive voltage on one of the windings. When the hall edge occurs, a controller records the phase of the voltage that it is driving at that instant. It makes the field spin by ramping this phase up with time, so this information is being generated by the controller itself.

With the low drive strength (small voltage amplitude) applied, the drive phase is recorded at each of the hall sensor's rising and falling edges. Then the higher drive strength is applied at the same spinning rate (i.e. the same frequency) and a second set of phases is recorded. The unknown rotor angle for each hall edge can be solved for from the two phase measurements and the ratio of the drive strengths.

In accordance with a non-limiting example embodiment of the present invention, a motor may be driven at a very low speed such that the phase angle due to the motor inductance is insignificant. By detecting parameters of the motor driven at a very low speed, a parameter β associated with back EMF, may be determined. The parameter β may then be used to determine a location of the detector relative to the stator of the motor.

When driving a motor at a very low speed, the drive strengths and angles would be defined by the stator currents rather than voltages. However, at low speeds the back-EMF and inductive reactance are negligible so the voltages can be used directly.

Because of the slow speed, variations in the torque due to "bumpiness" of the motor bearings etc. produce some residual error in the measured position. In accordance with another aspect of the present invention, it is possible to further improve the measurement by driving the motor at high speed (now that the nominal hall positions are known) and measuring the time between consecutive hall edges. This time (relative to a full revolution time) should be proportional to the difference between the recorded angles of the two hall edges.

In accordance with another aspect of the present invention, the sensor angle that is most incorrect may be determined, and corrected. In particular, the sensor that is early is compared to the previous sensor, whereas the sensor that is late is compared to the next sensor. The sensor with the worst combined earliness and lateness is offset to reduce the combined error by half and the process repeats until each sensor has a very small error. Once this is performed, the rotor angle at each hall edge is known to great precision, without having made any assumptions about their positions to begin with.

In accordance with another non-limiting example embodiment of the present invention, a motor may be driven at high speeds. The parameter β associated with back EMF may alternately be determined by detecting many instances of parameters of the motor driven at high speeds. The parameter β may then be used to determine a location of the detector relative to the stator of the motor. This example embodiment does not have the residual error associated with the "slow driving speed" embodiment discussed above.

Example embodiments of the present invention will now be described with reference to FIGS. 4A-12.

FIGS. 4A-D are cross-sectional illustrations for an example multi-phase conventional motor 100 using detectors for determining location information, in accordance with an aspect of the present invention.

A detector 402, a detector 404 and a detector 406 may be used for determining the location of rotor 104 with respect to stator 102. As a non-limiting example, detector 402 may be configured as a Hall-effect sensor (Hall sensor).

A plurality of detectors have been illustrated for motor 100, however location information may be sufficiently determined using one detector.

A Hall sensor makes use of the Hall effect, whereby a transducer varies its output voltage differential in response to changed in a magnetic field. Applications for Hall sensors include proximity switch, positioning, speed detection and current sensing. A Hall sensor may be configured for digital operation. For example, a digital Hall sensor may present a logic 1 when experiencing a first magnetic field with one directional component and may present a logic 0 when experiencing a second magnetic field with an opposite directional component from the first.

Figure 4A:
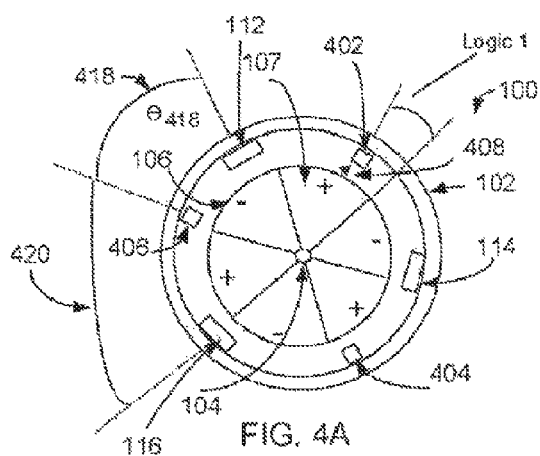
FIGS. 4A-D are cross-sectional illustrations for an example multi-phase conventional motor using detectors for determining location information, in accordance with an aspect of the present invention.

For example, as illustrated in FIG. 4A, detector 402 presents a logic 1, when experiencing a magnetic field as noted by an arrow 408 generated by magnet 107 with a magnet component directed toward detector 402.

Figure 4B:
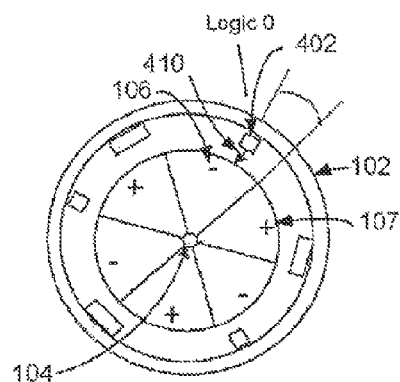

In FIG. 4B, rotor 104 has traveled clockwise from the location as illustrated in FIG. 4A. Magnet 106 is now located opposite detector 402 and is experiencing a magnetic field noted by an arrow 410 with a directional component directed away from detector 402. Furthermore, as a result of experiencing magnetic field as depicted by arrow 410, detector 402 presents a logic 0.

Figure 4C:
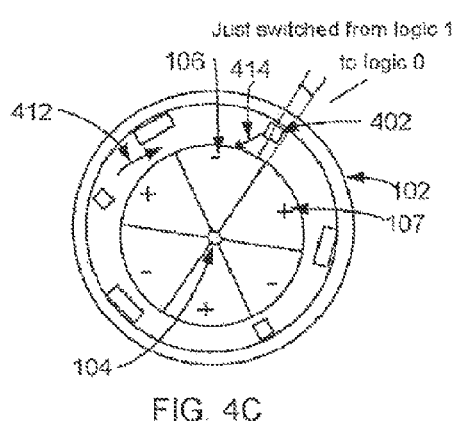

In FIG. 4C, rotor 104 is rotating with an angular velocity, as noted by an arrow 412. At the moment in time illustrated, detector 402 has switched from being influenced by the magnet field generated by magnet 107 and is now experiencing a magnetic field as noted by an arrow 414 generated by magnet 106. Just prior to the time frame as illustrated, detector 402 experienced a magnetic field generated by magnet 107 and detector 402 was presenting a logic 1. At the moment in time as illustrated in FIG. 4C, detector 402 is now presented with the magnetic field as depicted by arrow 414 and as a result detector 402 is presenting a logic 0.

Figure 4D:
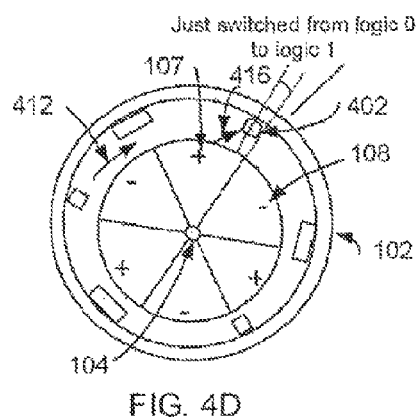

In FIG. 4D, rotor 104 is rotating with an angular velocity, as noted by arrow 412. At the moment in time illustrated, detector 402 has switched from being influenced by the magnet field generated by magnet 108 and is now experiencing a magnetic field as noted by an arrow 416 generated by magnet 107. Just prior to the time frame as illustrated, detector 402 experienced a magnetic field generated by magnet 108 and detector 402 was presenting a logic 0. At the moment in time as illustrated in FIG. 4C, detector 402 is now presented with the magnetic field as depicted by arrow 416 and as a result detector 402 is presenting a logic 1.

As illustrated in FIGS. 4C-D, a detector may be used to determine the location of a rotator with respect to stator using a detector, as a detector can be configured to communicate information associated with a transition from receiving a first magnetic field to receiving a second magnetic field with the second having an opposite directional component from the first.

In the manufacture of a motor, the location of a detector may vary from one motor to the next. As a result, the information obtained from a detector may vary from one motor to the next.

Figure 2A:
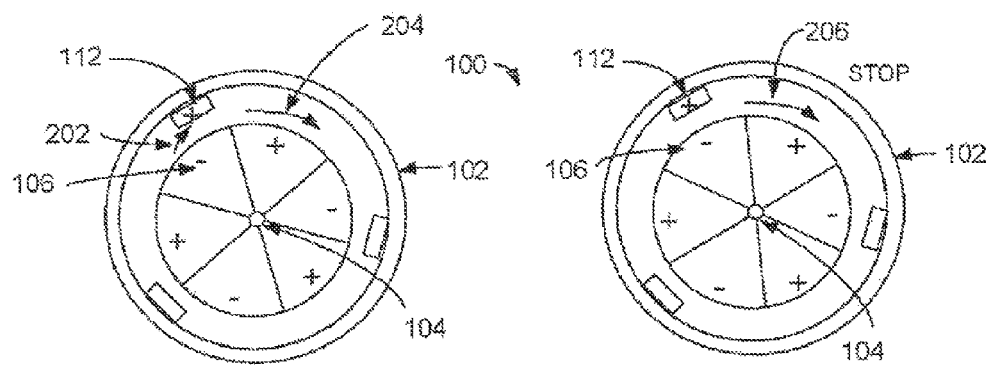
FIGS. 2A-F are cross-sectional illustrations for example conventional motor.
Figure 2B:
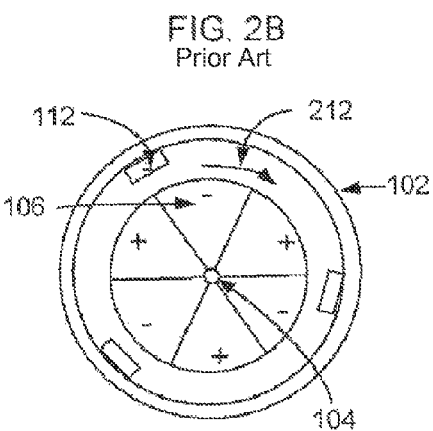
Figure 2C:
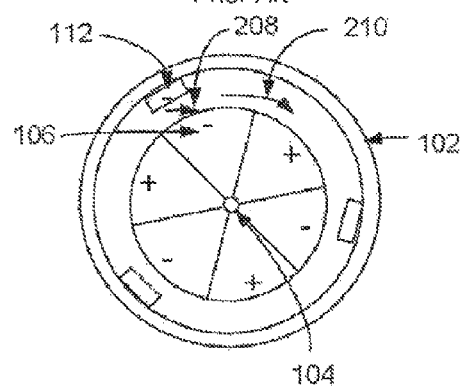
Figure 2D:
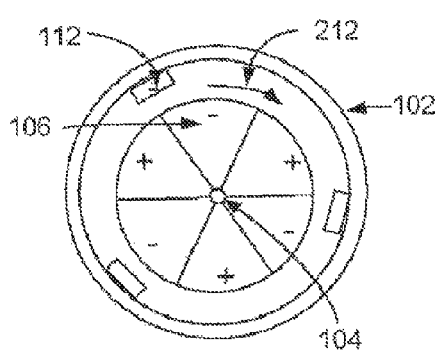
Figure 2E:
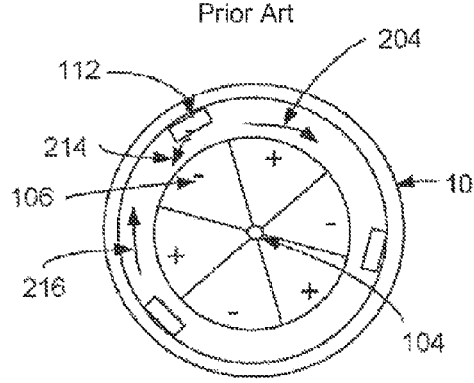
Figure 2F:
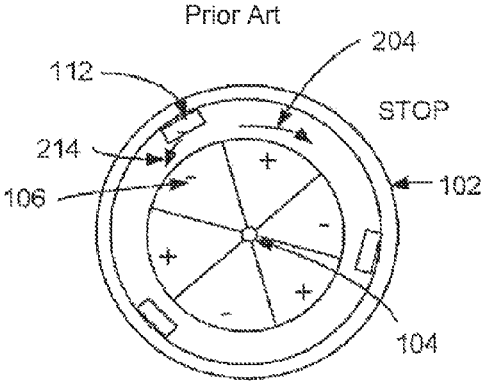
Figure 3:
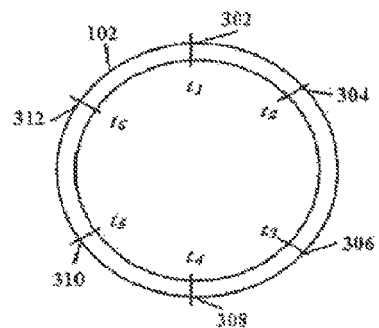
FIG. 3 illustrates an example cross-section timing selection diagram for determining the position of a rotor with respect to a stator.

For example, in FIG. 4A, detector 406 is not located midway between first leg 112 and third leg 116, as an angle 418, noted as $\theta_{418}$, is smaller than an angle 420, noted as $\theta_{420}$. If a user of motor presumes that the detector is located at angle $\theta_{418}$, the actual location of detector 406 results in inaccurate information associated with the location of rotor 104. Furthermore, the inaccurate information may result in improper or inefficient operation of motor 100. Furthermore, motor 100 may experience issues with operation as discussed with respect to FIGS. 2E-F.

Aspects in accordance with the present invention account for an unknown position of a detector, as will now be discussed with reference to FIG. 5.

Figure 5:
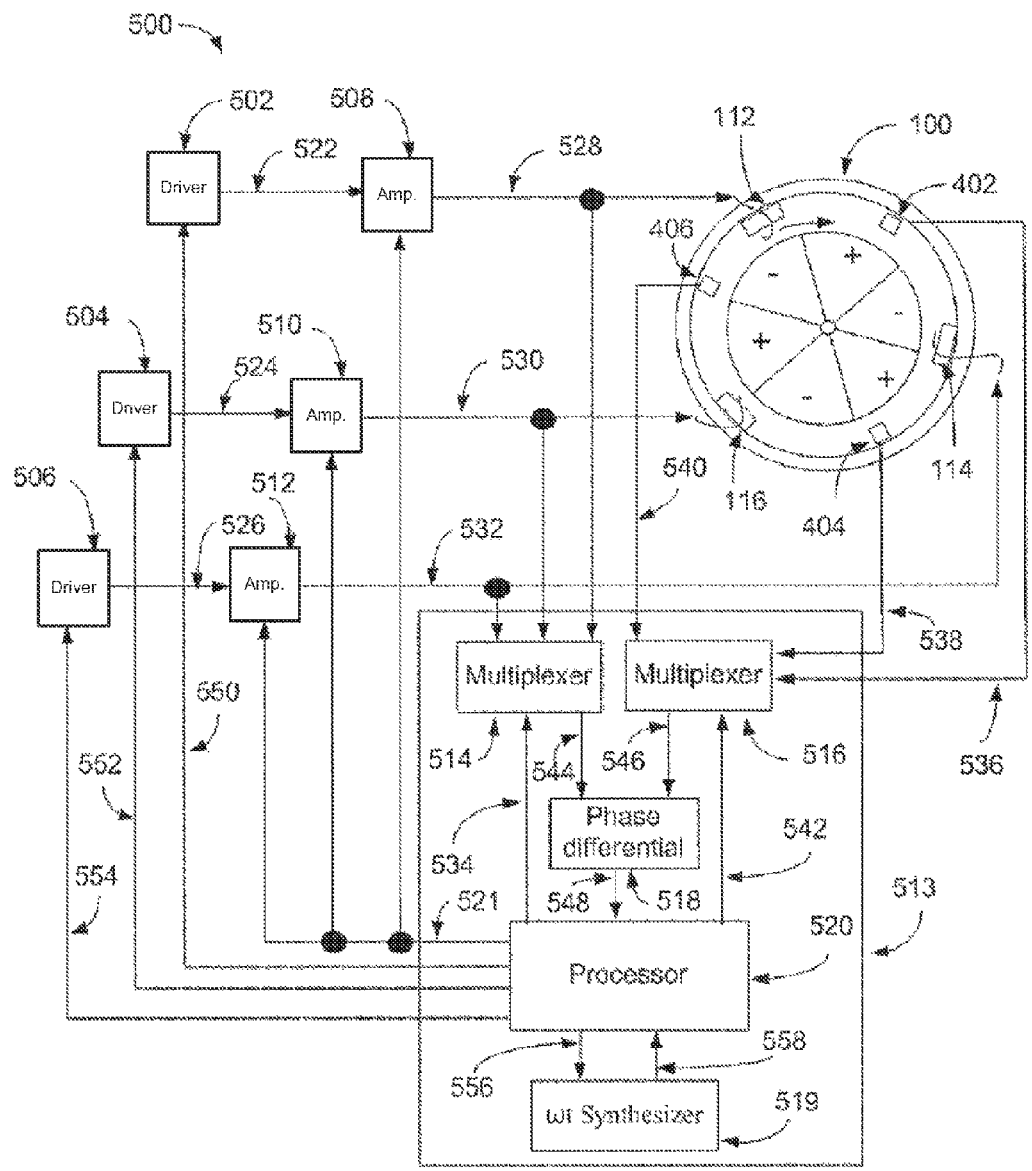
FIG. 5 illustrates an example motor system, in accordance with an aspect of the present invention.

FIG. 5 illustrates an example motor system 500, in accordance with an aspect of the present invention.

Motor system 500 includes motor 100, a driver 502, a driver 504, a driver 506, an amplifier 508, an amplifier 510, an amplifier 512 and a motor controller 513. Each of the elements of motor system 500 are illustrated as individual devices, however, in some embodiments of the present invention at least two of motor 100, driver 502, driver 504, driver 506, amplifier 508, amplifier 510, amplifier 512 and motor controller 513 may be combined as a unitary device.

Motor controller 513 includes a multiplexer 514, a multiplexer 516, a phase differential 518, an ωt synthesizer 519 and a processor 520. Each of the elements of motor controller 513 are illustrated as individual devices, however, in some embodiments of the present invention at least two of multiplexer 514, multiplexer 516, phase differential 518, ωt synthesizer 519 and processor 520 may be combined as a unitary device.

First leg 112 is arranged to receive a signal 528 from amplifier 508. Second leg 114 is arranged to receive a signal 532 from amplifier 512. Third leg 116 is arranged to receive a signal 530 from amplifier 510.

Multiplexer 514 is arranged to receive signal 528 from amplifier 508, signal 530 from amplifier 510, and signal 532 from amplifier 512. Multiplexer 516 is arranged to receive a signal 536 from detector 402, a signal 538 from detector 404 and a signal 540 from detector 406. Multiplexer is additionally arranged to receive a signal 542 from processor 520.

Phase differential 518 is arranged to receive a signal 544 from multiplexer 514 and to receive a signal 546 from multiplexer 516. Processor 520 is arranged to receive a signal 548 from phase differential 518. Driver 502 is arranged to receive a signal 550 from processor 520. Driver 504 is arranged to receive a signal 552 from processor 520. Driver 506 is arranged to receive a signal 554 from processor 520.

The ωt synthesizer 519 is arranged to receive a signal 556 from processor 520. Processor 520 is arranged to receive a signal 558 from ωt synthesizer 519.

Amplifier 508 is arranged to receive a signal 522 from driver 502 and a signal 521 from processor 520. Amplifier 510 is arranged to receive a signal 524 from driver 504 and to receive signal 521 from processor 520. Amplifier 512 is arranged to receive a signal 526 from driver 506 and signal 521 from processor 520.

Motor 100 operates as described with reference to FIGS. 1-4.

Drivers 502, 504 and 506 generate signals for driving motor 100. Furthermore, the phase of each signal generated by drivers 502, 504 and 506, respectively, is configurable. A non-limiting example of the type of signals generated by drivers 502, 504 and 506 includes sinusoidal signals.

An amplifier receives an input signal and amplifies the received signal. In this case, amplifier 508 receives signal 522, amplifies signal 522 and outputs signal amplified signal 522 as signal 528; amplifier 510 receives signal 524, amplifies signal 524 and outputs signal amplified signal 524 as signal 530; amplifier 512 receives signal 526, amplifies signal 526 and outputs signal amplified signal 526 as signal 530. Furthermore, the amplification applied by amplifiers 508, 510 and 512 may be configurable. In an example embodiment, the amplification applied by amplifiers 508, 510 and 512 is controlled by processor 520 via signal 521.

A motor controller receives information associated with driving signals and detector signals, and then processes the received information to control amplification for amplifiers and to control the phase offsets for drivers. In this case, motor controller 513 receives: information associated with driving signals, i.e., signals 528, 530 and 532; and receives information associated with detector signals, i.e., signals 536, 538 and 540. Motor controller 513 then processes the received information to: control amplification for amplifiers, i.e., 508, 510 and 512 via signal 521; and control the phase offsets for drivers, i.e., drivers 502, 504 and 506 via signals 550, 552 and 554, respectively.

A more detailed operation of motor controller 513 will now be provided with respect to the individual devices therein.

A multiplexer receives multiple input signals and selects one signal for output based on a selection/control signal. In this case, multiplexer 514 receives signals 528, 530 and 532 and selects one signal for output as signal 544. Signal selection for multiplexer 514 is configured via a signal 534. Multiplexer 514 receives signal 534 from processor 520 for controlling selection of signals 528, 530 and 532. Multiplexer 516 receives signals 536, 538 and 540 and selects one signal for output as signal 546. Signal selection for multiplexer 516 is configured via signal 542. Multiplexer 516 receives signal 542 from processor 520 for controlling selection of signals 536, 538 and 540.

A phase differential performs a phase differential calculation between two received signals. In this case, phase differential 518 performs a phase differential calculation between signal 544 and signal 546 and outputs the results as signal 548.

The ωt synthesizer 519 synthetically generates an ωt signal. The synthetically generated ωt signal is an approximate value for the actual ωt for motor system 500.

Processor 520 receives and processes signals for generation of signals to control the operation of motor system 500. In particular, processor 520 receives and processes signal 548 to control: driver 502 via signal 550; driver 504 via signal 552; driver 506 via signal 554; amplifiers 508, 510 and 512 via signal 521.

Signal 550 controls the phase of signal 522 as generated by driver 502. Signal 550 controls the amount and direction for shifting a sinusoidal signal as generated by driver 502. For example, signal 550 may shift the phase of signal 522 by 1 degree or by −1 degree. Signal 552 controls the phase of signal 524 as generated by driver. For example, signal 552 may shift the phase of signal 524 by 1 degree or by −1 degree. Signal 554 controls the phase of signal 526 as generated by driver. For example, signal 554 may shift the phase of signal 524 by 1 degree or by −1 degree. Signal 521 controls the amplification for amplifier 508, 510 and 512. For example, signal 521 may configure the peak voltages as produced by amplifiers, 508, 510 and 512 to 2 Volts.

Signals 522, 524 and 526 generated by drivers 502, 504 and 506, respectively, are nominally generated at a phase differential of 120°.

Amplifiers 508, 510 and 512 initiate amplification of received signals for supplying amplified signals to first leg 112, second leg 114 and third leg 116, respectively. Motor 100 receives driving signals and converts electrical power into a magnet fields associated with first leg 112, second leg 114 and third leg 116. Magnetic fields generated by first leg 112, second leg 114 and third leg 116 function to magnetically attract or repel the magnets associated with rotor 104.

As a result of the magnetic attraction and repulsion, rotor 104 rotates thereby converting electrical power into mechanical power. Motor 100 rotates as an angular velocity governed by the frequency of the signals as generated by drivers 502, 504 and 506. As rotor 104 rotates, detectors 402, 404 and 406 detect the transitions of magnetic fields generated by the magnets associated with rotor 104. As detectors 402, 404 and 406 detect a transition for a received magnetic field, the signals supplied by detectors 402, 404 and 406 transition from logic 0 to logic 1 and vice-versa.

Processor 520 selects, via signal 534, to deliver one of signals 528, 530 or 532 from multiplexer 514 to phase differential 518 as signal 544. Processor 520 additionally selects, via signal 542, to deliver one of signals 536, 538 or 540 from multiplexer 516 to phase differential 518 as signal 546.

Phase differential 518 determines a phase differential between signal 544 and signal 546. Phase differential 518 then provides the determined phase differential to the phase differential to processor 520 as signal 548.

The ωt synthesizer 519 receives configuration information from processor 520 via signal 556 for generating a synthetic wt. The synthetic ωt is then provided to processor 520 via signal 558.

Processor 520 receives and stores phase differential information in order to perform calculations at a later time. Processor 520 is additionally operable to modify the selection for multiplexers 514 and 516 for other legs and sensors of motor 100. Still further, processor 520 is operable to modify the amplification of amplifiers 508, 510 and 512 via signal 521.

Still further, processor 520 is operable to configure ωt synthesizer 519 and receive a synthetic ωt via signal 558.

Amplifiers 508, 510 and 512 supply amplified signals to first leg 112, second leg 114 and third leg 116, respectively.

Processor 520 repeats the process as described before for selection of multiplexers 514 and 516 and receives and stores phase differential information for the modified amplification of amplifiers 508, 510 and 512. Processor 520 is additionally operable to perform calculations for the received differential information and determines the physical location of detectors 402, 404 and 406.

Based upon the location of detectors 402, 404 and 406, processor 520 determines the amount of phase offset, if any, to be supplied to drivers 502, 504 and 506 via signals 550, 552 and 554, respectively.

Processor 520 modifies the phase offset, if any, to drivers 502, 504 and 506 via signals 550, 552 and 554, respectively.

As discussed for detector 406 with respect to FIG. 4, the physical location for a detector may vary from fabrication of one motor to the next and as a result experience negative consequences associated with the operation of a motor. Motor system 500 enables the determination for the location of the detectors associated with a motor. Furthermore, motor system 500 provides for modification of the operation of the system to accommodate for the location of the detectors. Further detailed discussion for the operation of motor system 500 will be presented in the following paragraphs.

Figure 6A:
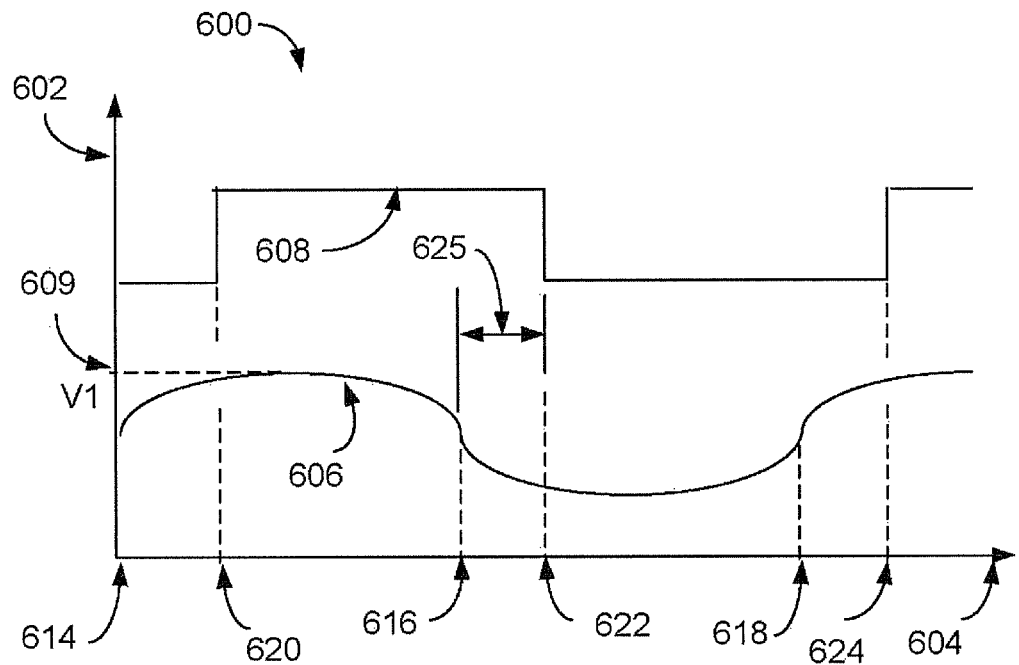
FIG. 6A-B is a graph of waveforms illustrating operation of a motor, in accordance with an aspect of the present invention.
Figure 6B:
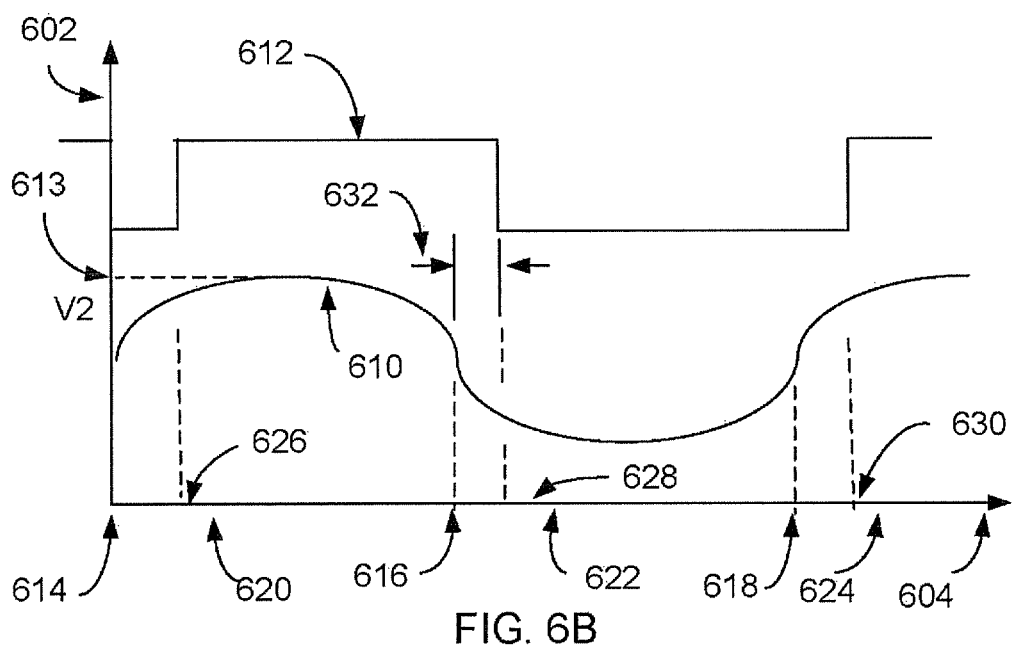

FIG. 6A-B is a graph 600 of waveforms illustrating operation of a motor, in accordance with an aspect of the present invention.

Graph 600 includes a y-axis 602 in Volts, and an x-axis 604, in milliseconds.

Graph 600 includes a waveform 606, a waveform 608, a waveform 610 and a waveform 612.

As shown in FIG. 6A, waveform 606 illustrates a sinusoidal signal as driven by one of amplifier 508 (described above with reference to FIG. 5), amplifier 510 or amplifier 512. For example, when amplifier 508 provides waveform 606, amplifier 510 would provide a sinusoidal signal 120° out of phase from waveform 606, whereas amplifier 512 would provide a sinusoidal signal 240° out of phase from waveform 606.

Waveform 606 initiates a sinusoidal cycle at a time 614 with a magnitude denoted as a voltage 609 or as $V_1$. At a time 616, waveform 606 transitions to the second half of the sinusoidal cycle. At a time 618, waveform 606 completes a sinusoidal cycle.

Waveform 608 illustrates a digital signal as generated by a detector associated with motor 100, e.g. one of detector 402 (discussed above with reference to FIG. 4), detector 404 or detector 406.

Waveform 608 initiates as a logic 0 at time 614. At a time 620, waveform 608 transitions to a logic 1. At a time 622, waveform 608 transitions to a logic 0. At a time 624, waveform 608 transitions to a logic 1.

For waveform 608, the timeframe from just after time 620 to just prior to time 622 was discussed with reference to FIG. 4A. Furthermore, the timeframe from just after time 622 to just prior to time 624 was discussed with reference to FIG. 4B; the timeframe from time 620 to just past time 620 was discussed with reference to FIG. 4C; and the timeframe from time 622 to just past time 622 was discussed with reference to FIG. 4D.

The time, as denoted by a phase differential 625, from waveform 606 transitioning to the second half of the sinusoidal cycle, or time 616, and the time at which waveform 608 transitions from logic 1 to logic 0, or time 622, may be represented as the phase difference between waveform 606 and waveform 608. Returning to FIG. 5, the phase differential 625, is the calculation performed by phase differential 518 and provided to processor 520 as signal 548.

As presented in FIG. 6B, waveform 610 initiates a sinusoidal cycle at time 614 with a magnitude denoted as a voltage 613 or as $V_2$. At time 616, waveform 606 transitions to the second half of the sinusoidal cycle. At time 618, waveform 606 completes a sinusoidal cycle.

Waveform 610 has the same timing signature as waveform 606, however, waveform 610 has a larger magnitude, as the peak voltage for waveform 610, $V_2$, is larger than the peak voltage, $V_1$, for waveform 606. The larger difference in voltage between waveform 606 and 610 is controlled by processor 520 via signal 521.

Waveform 612 initiates as a logic 0 at time 614. At a time 626, waveform 612 transitions to a logic 1. At a time 628, waveform 612 transitions to a logic 0. At a time 630, waveform 612 transitions to a logic 1.

As demonstrated, increasing the voltage for the sinusoidal signal applied to the motor, shifted the timing of waveform 612 as compared to waveform 608. Furthermore, the phase difference between the driven sinusoid and the detector signal has decreased and is denoted as a phase differential 632.

FIG. 6A-B illustrate how the timing for a detector associated with a motor may be modified by changing the magnitude of the sinusoidal signals driving the motor. As will be described in the discussion below, the ability to modify the voltage of the driving sinusoidal signals for a motor and subsequently measuring the resulting change in the timing for a detector enables the determination for the physical location of the detector.

Figure 7:
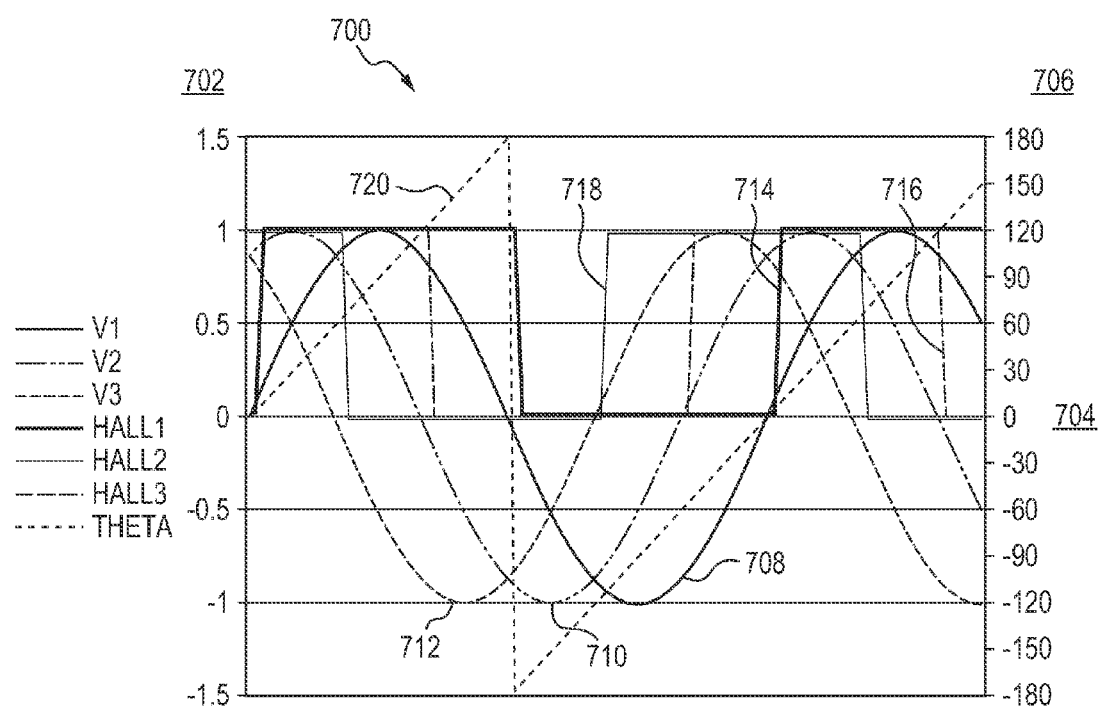
FIG. 7 is a graph of waveforms illustrating operation of a motor, in accordance with an aspect of the present invention.

FIG. 7 is a graph 700 of waveforms illustrating operation of a motor, in accordance with an aspect of the present invention.

Graph 700 includes a y-axis 702 in Volts, an x-axis 704 in milliseconds and a y-axis 706 in degrees.

Graph 700 includes a waveform 708, a waveform 710, a waveform 712, a detector waveform 714, a detector waveform 716, a detector waveform 718 and an accumulator waveform 720.

Figures 1C, 1D:
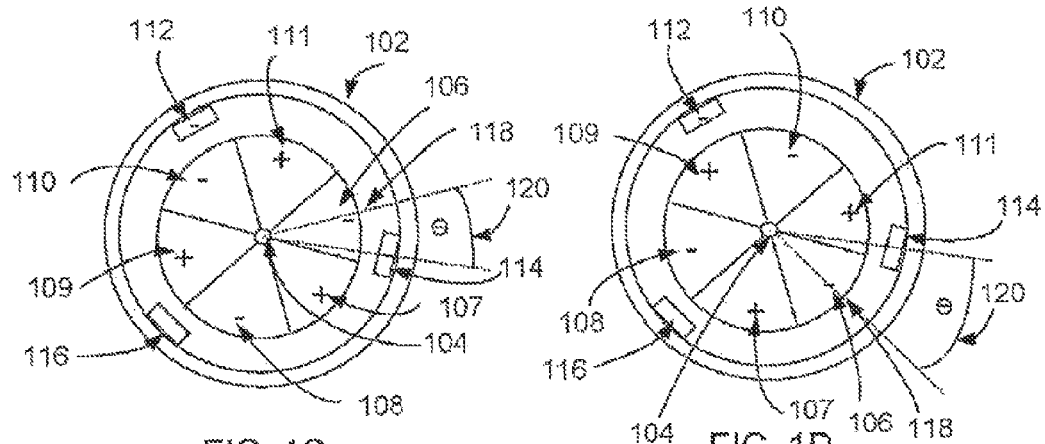
Figures 1E, 1F:
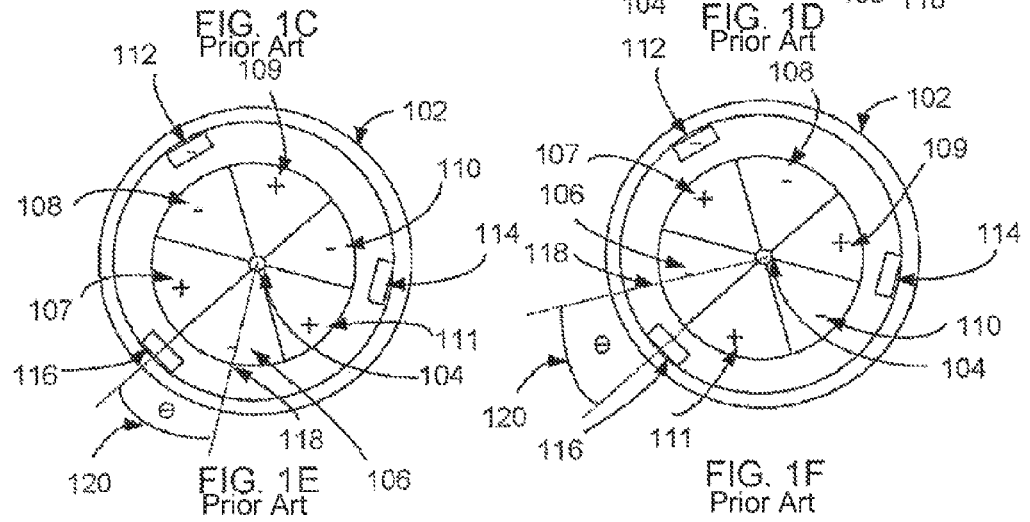

With additional reference to FIG. 1, Waveform 708, waveform 710 and waveform 712 represent the winding voltages for first leg 112, second leg 114 and third leg 116, respectively. The voltages for waveforms 708, 710 and 712 correspond to y-axis 702.

With additional reference to FIG. 4, detector waveform 714, detector waveform 716 and detector waveform 718 represent the voltages of detector signals for detector 402, detector 404 and detector 406, respectively. The voltages for detector waveforms 714, 716 and 718 correspond to y-axis 702.

Accumulator waveform 720 represents the angle of the phase accumulator associated with the motor control used for generating the sinusoidal signals of waveforms 708, 710 and 712. The angles for accumulator waveform 720 correspond to y-axis 702

For the conditions of graph 700 with a peak driving voltage of 1 Volt applied to the motor windings, the rising edge of detector waveform 714 occurs when accumulator waveform 720 is at 8°.

As the peak driving voltage of the winding voltages is increased, the timing of detector waveforms 714, 716 and 718, would shift slightly to the left for graph 700. Furthermore, the rising edges for detector waveforms 714, 716 and 718 would also have different accumulator angles.

For a typical implementation of three detectors, with each having a rising edge and falling edge, six discrete rotor positions may be identified.

FIG. 7 illustrates how the timing and phase information for detectors associated with a motor may be modified by changing the magnitude of the sinusoidal signals driving the motor. As will be further described in the discussion below, the ability to modify the voltage of the driving sinusoidal signals for a motor and subsequently measuring the resulting change in the timing for a detector enables the determination for the physical location of the detector. Further background information associated with the operation of a motor will be discussed with reference to FIGS. 8-10.

Figure 8A:
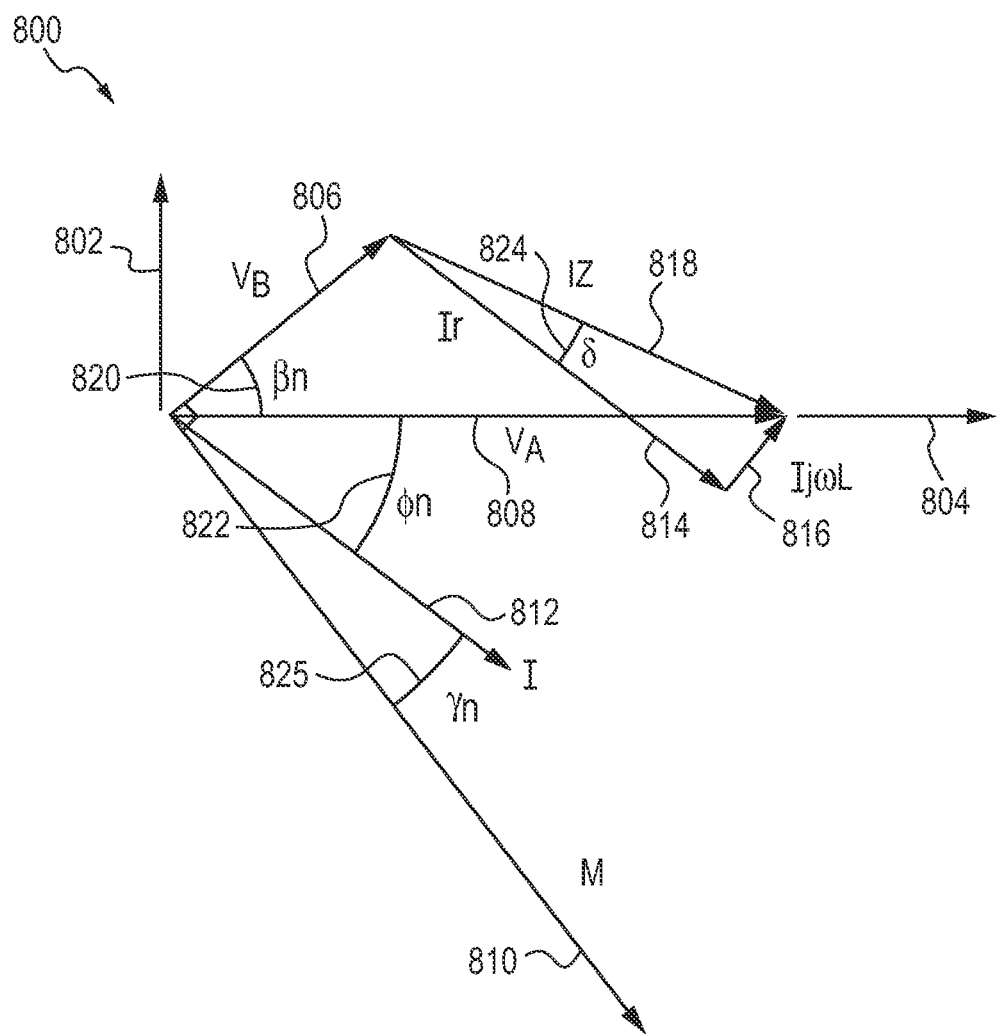
FIG. 8A-B is an example phasor diagram illustrating operation for a motor, in accordance with an aspect of the present invention.
Figure 8B:
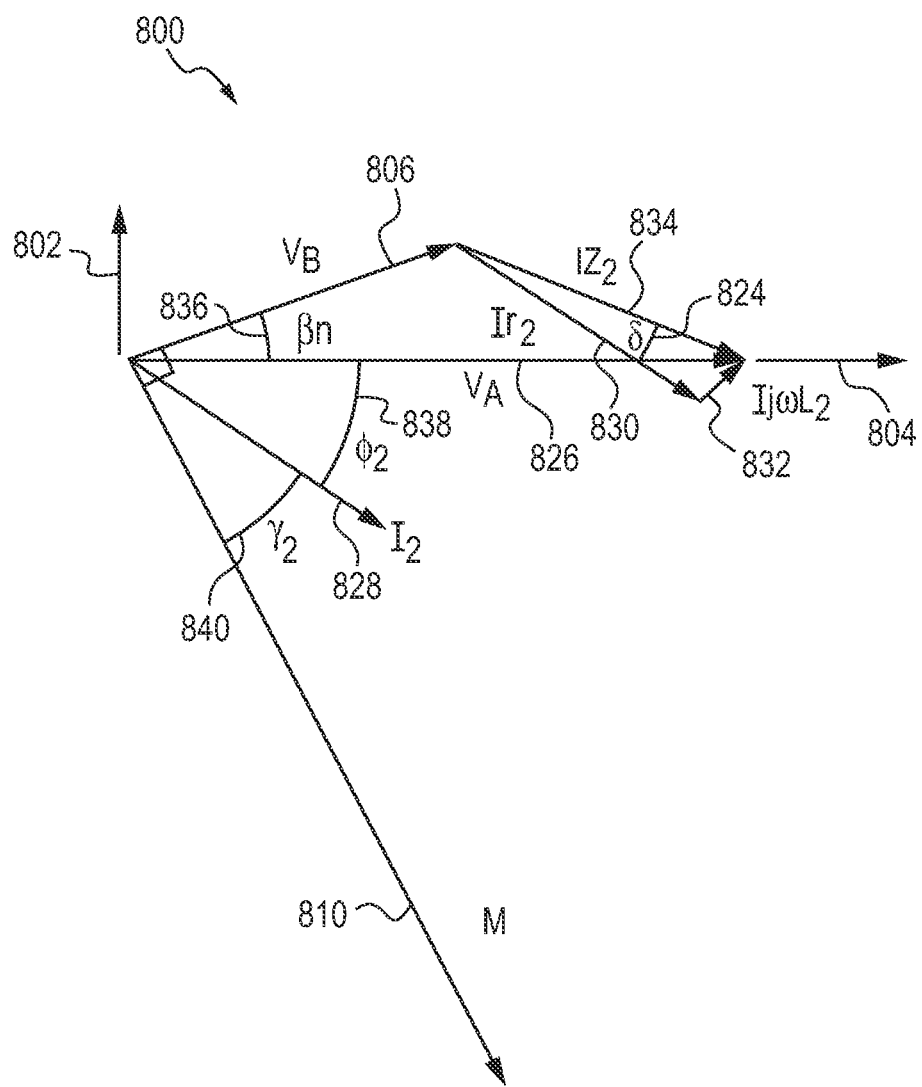

FIG. 8A-B is an example phasor diagram 800 illustrating operation for a motor, in accordance with an aspect of the present invention.

Phasor diagram 800 includes a y-axis 802 in units of magnitude, an x-axis 804 in units of magnitude.

As illustrated in FIG. 8A, phasor diagram 800 includes a back EMF vector 806 also denoted as $V_B$, a winding voltage vector 808 also denoted as $V_A$, a rotor magnetic moment vector 810 also denoted as M, a winding current vector 812 also denoted as I, a winding resistance voltage vector 814 also denoted as IR, a winding inductance voltage vector 816 also denoted as $Ij\omega L$, and a voltage vector 818 also denoted as IZ.

Voltage vector 818 is a voltage vector representing the portion of the voltage across the motor winding that is not back-EMF. Furthermore, voltage vector 818 is the sum of the voltage across the winding resistance and the voltage across the winding inductance.

Vectors in phasor diagram 800 rotate in a counter-clockwise circle at a frequency of $\omega$.

FIG. 8A represents a snapshot for when the phase associated with winding voltage vector 808 is zero.

Back EMF vector 806 represents the back EMF for the motor. When applying a voltage to create a current, a motor's armature may begin to rotate and as a result a certain amount of electro motive force generated by the rotating magnetic field. Furthermore, this amount of electro motive force may be denoted as the back EMF. For a motor using a rotating armature in the presence of a magnetic flux, the coil conductors of the motor transition through the magnet field lines as the motor rotates. The changing field strength produces voltages in the coils, which may be considered as the motor operating in a similar manner as a generator, or also may be considered as the voltage produced from the back EMF opposing the originally applied voltage.

Winding voltage vector 808 represents the voltage applied to a winding for a leg of the motor (e.g. first leg 112 (FIGS. 1-5)). Rotor magnetic moment vector 810 represents the magnet moment for a motor. Winding current vector 812 represents the current traversing a winding for a leg of the motor (e.g. first leg 112). Winding resistance voltage vector 814 represents the voltage associated with the resistive portion of the winding for a leg of the motor (e.g. first leg 112). Winding inductance voltage vector 816 represents the voltage associated with the inductive portion of the winding for a leg of the motor (e.g. first leg 112). Voltage vector 818 is a voltage vector representing the portion of the voltage across the motor winding that is not back-EMF. Furthermore, voltage vector 818 is the sum of the voltage across the winding resistance and the voltage across the winding inductance.

As may be observed, winding voltage vector 808 equals the sum of winding resistance voltage vector 814, winding inductance voltage vector 816 and back EMF vector 806.

Furthermore, as may be observed, voltage vector 818 equals the sum of winding inductance voltage vector 816 and winding resistance voltage vector 814.

An angle 820, also denoted as $\beta_n$, represents the phase angle associated with back EMF vector 806. An angle 822, also denoted as n, represents the phase angle associated with winding current vector 812. An angle 824, also denoted as δ, represents the phase angle associated with the inductive voltage of the winding. An angle 825, also denoted as $\gamma_n$, represents the angle (lag) the rotor magnetic moment vector 810 behind the winding current vector 812.

Angle 820 and angle 822 are measured with respect to an arbitrary reference. For this example, angle 820 and angle 822 are measured when winding voltage vector 808 crosses x-axis 804.

It is possible to calculate δ and (the magnitude of) $V_B$, however it is not possible to calculate $\beta_n$ and n, intermediary variables used for determining the location of the back-EMF voltage vector, as there are too many unknowns for the number of available equations. β, indicates where the sensor is physically located with respect to the stator windings. $\beta_n$, is an intermediary used to find β

FIG. 8B illustrates operation for a motor wherein the voltage applied is less than sourced as discussed with reference to FIG. 8A.

A winding voltage vector 826, also denoted as $V_2$, represents a reduced voltage applied to a winding for a leg of the motor (e.g. first leg 112) as compared to FIG. 8A. The voltage associated with winding voltage vector 826 is greater than the voltage required to drive the load at the same speed as per the conditions as described with reference to FIG. 8A.

FIG. 8B represents a snapshot for when the phase associated with winding voltage vector 826 is zero.

A winding current vector 828, also denoted $I_2$, represents a reduced current traversing a winding for a leg of the motor (e.g. first leg 112), as compared to FIG. 8A. A winding resistance voltage vector 830, also denoted as $Ir_2$, represents a reduced voltage associated with the resistive portion of the winding for a leg of the motor (e.g. first leg 112), as compared to FIG. 8A. A winding inductance voltage vector 832, also denoted as $Ij\omega L_2$, represents a reduced voltage associated with the inductive portion of the winding for a leg of the motor (e.g. first leg 112), as compared to FIG. 8A. A voltage vector 834, also denoted as $IZ_2$, represents reduced power applied to the winding for a leg of the motor (e.g. first leg 112), as compared to FIG. 8A.

As may be observed, winding voltage vector 826 equals the sum of winding resistance voltage vector 830, winding inductance voltage vector 832 and back EMF vector 806.

An angle 836, also denoted as $\beta_2$, represents a modified phase angle associated with back EMF vector 806, as compared to FIG. 8A. An angle 838, also denoted as 2, represents a modified phase angle associated with winding current, as compared to FIG. 8A. An angle 840, also denoted as $\gamma_2$, represents a modified angle associated with the rotor magnetic moment vector 810 lagging behind the winding current, as compared to FIG. 8A.

The applied voltage associated with winding voltage vector 826, $V_2$, is less than winding voltage vector 808 (FIG. 8A). The reduced applied voltage results in a smaller current associated with winding current vector 828, $I_2$.

In order for rotor 104 to maintain a constant torque, rotor magnetic moment vector 810 lags further behind winding current vector 828 resulting in a larger angle associated with angle 840 than that of angle 825 as described with reference to FIG. 8A.

Figure 9:
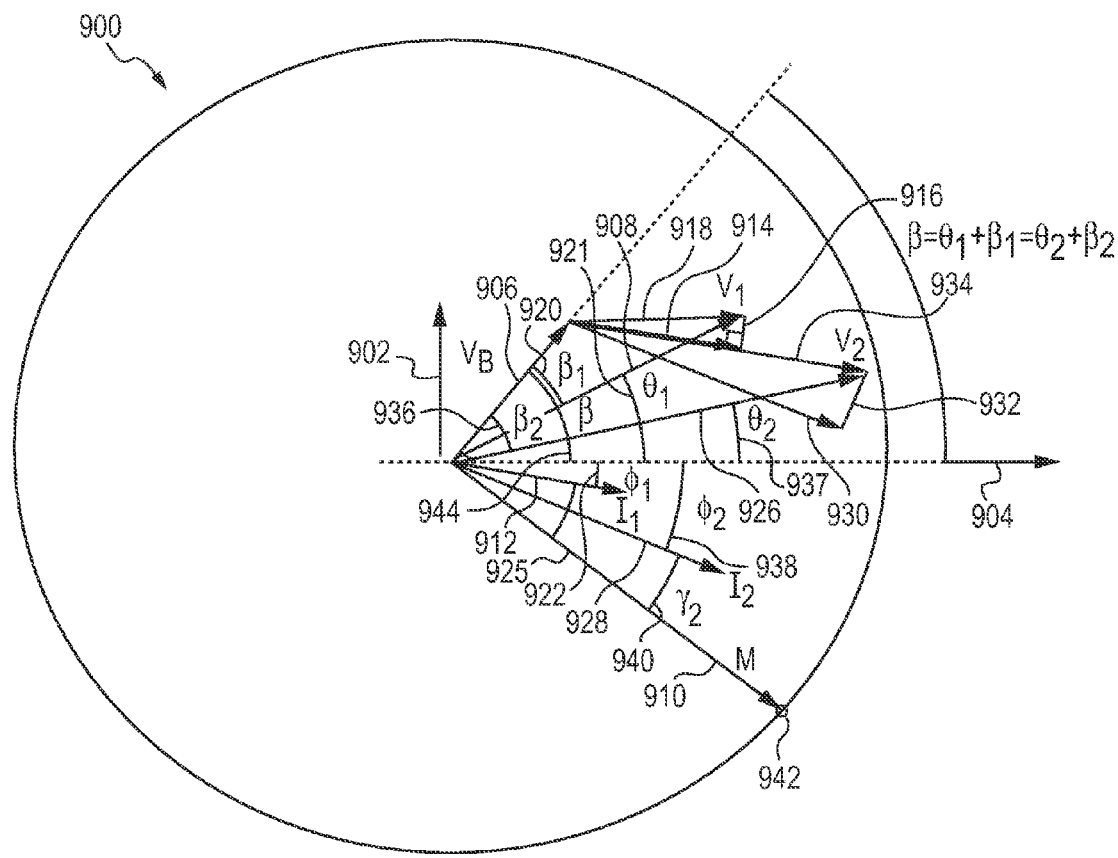
FIG. 9 is an example phasor diagram illustrating operation of a motor with application of two different winding voltages, in accordance with an aspect of the present invention.

FIG. 9 is an example phasor diagram 900 illustrating operation of a motor with application of two different winding voltages, in accordance with an aspect of the present invention.

FIG. 9 combines the elements of FIG. 8A and FIG. 8B into a single illustration. The capture reference for FIG. 9 is different than for FIGS. 8A-B. FIGS. 8A-B are captured when the applied voltage (e.g. winding voltage vector 808 as described with reference to FIG. 8A and winding voltage vector 826 as described with reference to FIG. 8B.) is in phase or parallel with x-axis 804. FIG. 9 is captured when the detector (e.g. detector 402 as described with reference to FIG. 4) detects and signals an example event.

Phasor diagram 900 includes a y-axis 902 in units of magnitude, an x-axis 904 in units of magnitude.

Phasor diagram 900 includes a back EMF vector 906 also denoted as $V_B$, a first winding voltage vector 908 also denoted as $V_1$, a rotor magnetic moment vector 910 also denoted as M, a first winding current vector 912 also denoted as $I_1$, a first winding resistance voltage vector 914, a first winding inductance voltage vector 916, a first voltage vector 918, a second winding voltage vector 926 also denoted as $V_2$, a second winding current vector 928, also denoted as $I_2$, a second winding resistance voltage vector 930, a second winding inductance voltage vector 932 and a second voltage vector 934.

Vectors in phasor diagram 900 rotate in a counter-clockwise circle at a frequency of ω.

Back EMF vector 906 represents the back EMF for the motor. First winding voltage vector 908 represents the voltage applied to a winding for a leg of the motor (e.g. first leg 112). Rotor magnetic moment vector 910 represents the magnet moment for a motor. First winding current vector 912 represents the current traversing a winding for a leg of the motor (e.g. first leg 112). First winding resistance voltage vector 914 represents the voltage associated with the resistive portion of the winding for a leg of the motor (e.g. first leg 112). First winding inductance voltage vector 916 represents the voltage associated with the inductive portion of the winding for a leg of the motor (e.g. first leg 112). First voltage vector 918 represents the power applied to the winding for a leg of the motor (e.g. first leg 112).

As may be observed, first winding voltage vector 908 equals the sum of first winding resistance voltage vector 914, first winding inductance voltage vector 916 and back EMF vector 906.

Furthermore, as may be observed, second winding voltage vector 926 equals the sum of second winding resistance voltage vector 930, second winding inductance voltage vector 932 and back EMF vector 906.

An angle 920, also denoted as $\beta_1$, represents the phase angle associated with back EMF vector 906. An angle 921, also denoted as $\theta_1$, represents the instantaneous phase for $V_1$ when a detector switches from driving logic 1 to logic 0. An angle 922, also denoted as 1, represents the phase angle associated with first winding current vector 912. An angle 925, also denoted as $\gamma_1$, represents the angle the rotor magnetic moment vector 910 lags behind the first winding current vector 912.

Second winding current vector 928, also denoted $I_2$, represents an increased current traversing a winding for a leg of the motor (e.g. first leg 112), as compared to first winding current vector 912. Second winding resistance voltage vector 930, represents an increased voltage associated with the resistive portion of the winding for a leg of the motor (e.g. first leg 112), as compared to first winding resistance voltage vector 914. Second winding inductance voltage vector 932, represents an increased voltage associated with the inductive portion of the winding for a leg of the motor (e.g. first leg 112), first winding inductance voltage vector 916. Second voltage vector 934, represents increased power applied to the winding for a leg of the motor (e.g. first leg 112), first voltage vector 918.

An angle 936, also denoted as $\beta_2$, represents a modified phase angle associated with back EMF vector 806, as compared to angle 920. An angle 937, also denoted as $\theta_2$, represents the instantaneous phase for $V_2$ when a detector switches from driving logic 1 to logic 0. An angle 938, also denoted as 2, represents a modified phase angle associated with winding current, as compared to angle 922. An angle 940, also denoted as $\gamma_2$, represents a modified angle associated with the rotor magnetic moment vector 810 lagging behind the winding current, as compared to angle 925.

Phasor diagram 900 represents a snapshot for the operation of a motor at the occurrence of a detector switching from logic 1 to logic 0. Furthermore, phasor diagram 900 represents a snapshot of two differing conditions for the motor. For the first condition, a voltage, $V_1$, is applied to the winding of the motor and for the second condition a larger voltage, $V_2$, is applied to the winding of the motor.

A point 942, associated with rotor magnetic moment vector 910, represents a condition for the switching of the detector from logic 1 to logic 0 as discussed previously with respect to FIGS. 4C-D.

As illustrated, back EMF vector 906, $V_B$, is in the same position regardless of the voltage applied to the motor windings.

An angle 944, also denoted as $\beta$, represents the phase angle associated with back EMF vector 906 or $V_B$. Angle 944 may also be characterized as $\theta_1+\beta_1$ and also $\theta_2+\beta_2$. Angle 944 or $\beta$ will be discussed in more detail in the following paragraphs.

Figure 10:
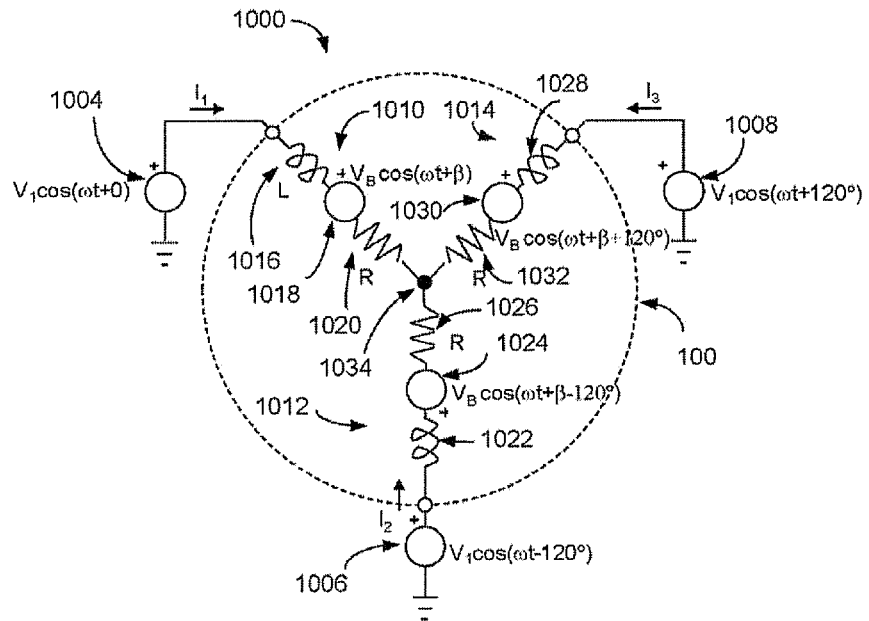
FIG. 10 is a schematic diagram for an example three-phase motor system, in accordance with an aspect of the present invention.

FIG. 10 is a schematic diagram for an example three-phase motor system 1000, in accordance with an aspect of the present invention.

Three-phase motor system 1000 includes motor 100, a driver 1004, a driver 1006 and a driver 1008.

Driver 1004 provides a sinusoidal signal with a frequency of w, a phase of zero degrees, a peak voltage of $V_1$ and a current of $I_1$. Driver 1004 may further be characterized by Equation (1) shown below:

$$V_1 \cos(\omega t + 0) \tag{1}$$

Driver 1006 provides a sinusoidal signal with a frequency of $\omega$, a phase of −120 degrees, a peak voltage of $V_1$ and a current of $I_2$. Driver 1006 may further be characterized by Equation (2) shown below:

$$V_1 \cos(\omega t - 120°) \tag{2}$$

Driver 1008 provides a sinusoidal signal with a frequency of $\omega$, a phase of +120 degrees, a peak voltage of $V_1$ and a current of $I_3$. Driver 1008 may further be characterized by Equation (3) shown below:

$$V_1 \cos(\omega t + 120°) \tag{3}$$

Motor 100 includes a first leg 1010, a second leg 1012 and a third leg 1014.

First leg 1010, second leg 1012 and third leg 1014 schematically represent the windings for motor 100. First leg 1010 includes an inductive portion 1016, a back EMF portion 1018 and a resistive portion 1020. Second leg 1012 includes an inductive portion 1022, a back EMF portion 1024 and a resistive portion 1026. Third leg 1014 includes an inductive portion 1028, a back EMF portion 1030 and a resistive portion 1032.

Inductive portion 1016, inductive portion 1022 and inductive portion 1028 are a result of the inductance associated with the windings of motor 100. Resistive portion 1020, resistive portion 1026 and resistive portion 1032 are a result of the resistance associated with the windings of motor 100. Back EMF portion 1018, back EMF portion 1024 and back EMF portion 1030 are a result of the back EMF induced from the operation of motor 100.

A first terminal of driver 1004 connects to ground potential. A second terminal of driver 1004 connects to a first terminal of inductive portion 1016. A second terminal of inductive portion 1016 connects to a first terminal back EMF portion 1018. A second terminal of back EMF portion 1018 connects to a first terminal of resistive portion 1020. A second terminal of resistive portion 1020 connects to a point 1034.

A first terminal of driver 1006 connects to ground potential. A second terminal of driver 1006 connects to a first terminal of inductive portion 1022. A second terminal of inductive portion 1022 connects to a first terminal back EMF portion 1024. A second terminal of back EMF portion 1024 connects to a first terminal of resistive portion 1026. A second terminal of resistive portion 1026 connects to point 1034.

A first terminal of driver 1008 connects to ground potential. A second terminal of driver 1008 connects to a first terminal of inductive portion 1028. A second terminal of inductive portion 1028 connects to a first terminal back EMF portion 1030. A second terminal of back EMF portion 1030 connects to a first terminal of resistive portion 1032. A second terminal of resistive portion 1032 connects to point 1034.

Back EMF portion 1018 is characterized by a sinusoidal signal with a frequency of $\omega$, a peak voltage of $V_B$ and a phase of $\beta$ also noted as angle 944 described with reference to FIG. 9. Back EMF portion 1018 may further be characterized by Equation (4) shown below:

$$V_B \cos(\omega t + \beta) \tag{4}$$

Back EMF portion 1024 is characterized by a sinusoidal signal with a frequency of $\omega$, a peak voltage of $V_B$ and a phase of $\beta-120°$. Back EMF portion 1024 may further be characterized by Equation (5) shown below:

$$V_B \cos(\omega t + \beta - 120°) \tag{5}$$

Back EMF portion 1030 is characterized by a sinusoidal signal with a frequency of $\omega$, a peak voltage of $V_B$ and a phase of $\beta+120°$. Back EMF portion 1030 may further be characterized by Equation (6) shown below:

$$V_B \cos(\omega t + \beta + 120°) \tag{6}$$

As discussed previously with respect to FIG. 9, angle 921 or $\theta_1$ represents the value of $\omega t$ when a detector edge occurs.

As an example, the instant a detector edge occurs, the voltage for driver 1004 would be given by $V_1 \cos(\theta_1)$. Furthermore, processor 520 (FIG. 5) is able to digitally synthesize a value for $\omega t$, so processor 520 is able to determine the voltage for driver 1004 when $\omega t$ is equal to $\theta_1$.

An Equation (7) may be derived for $\gamma_1$ also noted as angle 925 (FIG. 9) as shown below:

$$\gamma_1 = \tan^{-1}\left(\frac{I_2 \sin(\phi_1 - \phi_2)}{I_1 - I_2 \cos(\phi_1 - \phi_2)}\right) \tag{7}$$

The maximum efficiency (i.e. least electrical power provided for realizing maximum mechanical power) is achieved when the current is in phase with the back EMF at the occurrence of a detector edge which is when the driven current has a phase as given by Equation (8) shown below:

$$\text{Best} = \pi/2 - 1 - \gamma_1 \tag{8}$$

Where 1 represents angle 922 (FIG. 9) and $\gamma_1$ represents angle 925 (FIG. 9).

The variable Best may be visualized in FIG. 9 as occurring when the winding current vector (e.g. first winding current vector 912) is in phase or parallel with back EMF vector 906.

However, performance of Equation (8) requires either a current measurement circuit or an atypical drive circuit. The present invention does not require measurement of current, but rather operates based on voltage.

For a voltage driven system, the maximum efficiency occurs when the winding current is in phase with the back EMF at the occurrence of a detector edge and may be achieved when the phase for $V_A$ (FIG. 9) conforms to Equation (9) as shown below:

$$\theta_{best} = \beta + \delta - \sin^{-1}\left(\frac{V_B \sin\delta}{V_A}\right) \quad (9)$$

The variable β represents the angular location when a detector event occurs as represented by angle 944 as described with reference to FIG. 9. The variable $V_B$ represents the magnitude back EMF vector 906, which corresponds to angle 944.

The variable best may be visualized in FIG. 9 as when the winding current vector (e.g. first winding current vector 912 or second winding current vector 928) is in phase or parallel with back EMF vector 906.

An Equation (10) for β+δ may be derived as shown below:

$$\beta + \delta = \tan^{-1}\left(\frac{V_1 - V_2}{V_1 + V_2}\cot\left(\frac{\theta_2 - \theta_1}{2}\right)\right) + \frac{\theta_1 + \theta_2}{2} = \beta + \tan^{-1}\left(\frac{\omega L}{r}\right) \quad (10)$$

Equation (10) may be rearranged to form Equation (11) as shown below:

$$\beta + \delta = \tan^{-1}\left(\frac{\frac{V_2}{V_1}\cos\theta_2 - \cos\theta_1}{\sin\theta_1 - \frac{V_2}{V_1}\sin\theta_2}\right) = \beta + \tan^{-1}\left(\frac{\omega L}{r}\right) \quad (11)$$

The variable β represents the angular location of the detector when a detector event occurs as represented by angle 944 as described with reference to FIG. 9. The variable L represents the inductance of the motor winding. The variable $V_1$ represents a first applied voltage. The variable $V_2$ represents a second applied voltage. The variable 1 represents a first measured angle. The variable 2 represents a second measured angle. The value of δ may be determined if the equation is plotted vs. ω. Further, it is true that $\delta = \tan^{-1}(\omega L/r)$ and if L and r are known for the motor, then δ can be determined from equation (11). However δ is independent of the sensor position. In accordance with aspects of the present invention, δ may additionally be determined by rotating the motor without knowing L, r or ever measuring the motor current. The variable r represents the resistance of the motor winding. Plotting Equation (10) or Equation (11) versus ω enables determination of δ without knowing motor resistance, r, and/or motor inductance, L. The value for $V_B$ (e.g. back EMF vector 906 as described with reference to FIG. 9) is found from the motor constant and is illustrated by Equation (12) shown below:

$$V_B = \omega k_M \quad (12)$$

The variable ω in Equation (12) represents the angular frequency of the drive signal which controls the speed of the motor. The parameter $k_M$ represents the motor constant. The motor constant, $k_M$, is a figure of merit used to compare the relative efficiencies of different motors. It may be referred to as the "back-emf constant" and is the ratio of back-emf to motor angular-velocity, which is also equal to the ratio of motor torque to winding current. A higher value of $k_M$ means the motor can produce more force for a given amount of power lost. The parameter $k_M$ is provided by the motor manufacturer or may be derived if all the mechanical characteristics of the motor are known.

By measuring β+δ at different speeds. As a non-limiting example, β+δ is measured at a minimum of two speeds in order to determine the location of a detector.

The ratio of L/r can be found for sin(δ) for an optimal phase for a plurality of speeds and drive strengths.

FIG. 10 is a schematic diagram for an example three-phase motor system wherein a motor may be driven at varying voltages and speeds for determining an amount of phase shift to apply to the driving signals such that the motor operates efficiently.

Figure 11:
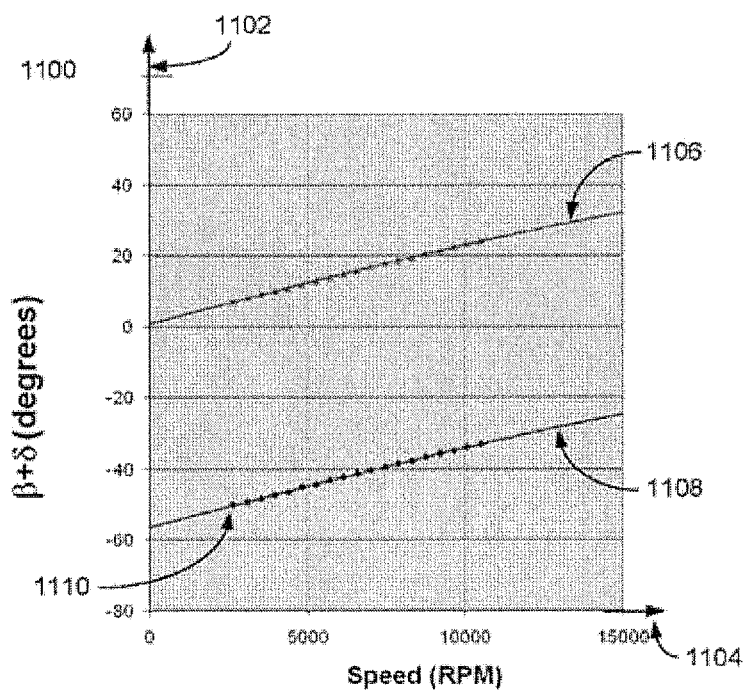
FIG. 11 is a graph of waveforms illustrating operation of a motor, in accordance with an aspect of the present invention.

FIG. 11 is a graph 1100 of waveforms illustrating operation of a motor, in accordance with an aspect of the present invention.

Graph 1100 includes a y-axis 1102 in degrees and an x-axis 1104 in Revolutions Per Minute (RPM).

Graph 1100 includes a phase-A waveform 1106 and a phase-B waveform 1108.

Phase-A waveform 1106 initiates at an x-axis and a y-axis of zero and increases linearly. Phase-B waveform 1106 follows a slightly curved inverse tangent function, as will be described in more detail below with reference to equation (13). Furthermore, phase-A terminates at an x-axis value of 15000 RPM and a y-axis value of approximately 30 degrees.

Phase-B waveform 1108 initiates at an x-axis value of zero and a y-axis value of approximately −55 degrees, and increases nearly linearly. Phase-B waveform 1108 follows a slightly curved inverse tangent function, as will be described in more detail below with reference to equation (13). Furthermore, phase-B terminates at an x-axis value of 15000 RPM and a y-axis value of approximately −25 degrees.

The points associated with phase-A waveform 1106 are the β+δ found from Equation (10) for the rising edge of a first detector (e.g. detector 402 of FIG. 4) with two different driving speeds. The points associated with phase-B waveform 1108 are the β+δ found from Equation (10) for the rising edge of a second detector (e.g. detector 404 of FIG. 4) with two different driving speeds.

As an example, at 2,628 RPM the motor was first driven with a 2 Volt amplitude and the driving phase at the falling edge of first detector was observed at −122.14 degrees. The amplitude of the signal was subsequently modified to 2.5 Volt and the observed driving phase at the falling edge of a third detector changed to −125.86 degrees. From these measurements, β+δ was calculated as −50.29 degrees denoted as a point 1110 on graph 1100.

The various data points sampled at various speeds were then fit to the Equation (13) shown below:

$$\beta + \delta = \beta + \tan^{-1}(\omega L/r) \quad (13)$$

Sampling the data points as described in the previous paragraph enables determination of β as the value of β+δ project for ω equal to zero. Furthermore, the ratio of the motor winding inductance to winding resistance (L/r) can also be determined. Furthermore, this may be performed for a multiplicity of phases.

Once the calibration has been performed, the motor is no longer driven open loop, but instead driven using the optimal phase angle information determined from the calibration data.

FIG. 11 is a graph of waveforms illustrating operation of a motor for an example three-phase motor system wherein a motor may be driven at varying voltages and speeds for determining an amount of phase shift to apply to the driving signals such that the motor operates efficiently.

Figure 12:
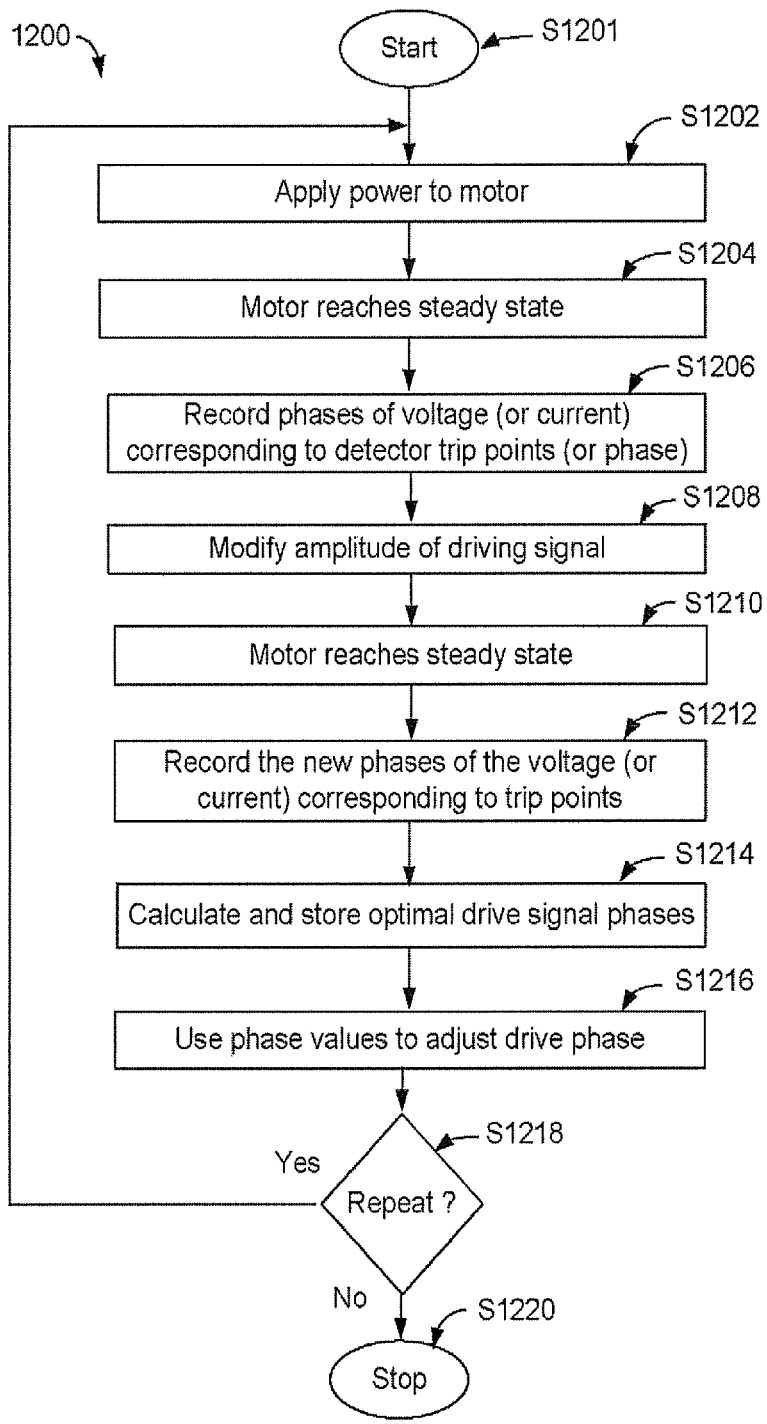
FIG. 12 illustrates an example method for determining the location of detectors for improving the operation of a motor, in accordance with an aspect of the present invention.

FIG. 12 illustrates an example method 1200 for determining the location of detectors for improving the operation of a motor, in accordance with an aspect of the present invention.

Method 1200 starts (S1201) and power is applied to the motor (S1202). In an example embodiment, with additional reference to FIG. 5, drivers 502, 504 and 506 are enabled for operation. Motor 100 is allowed to operate open loop, i.e. the signals 550, 552 and 554 do not adjust the phase offset for drivers 502, 504 and 506.

Then the motor is allowed to reach a steady state condition (S1204). For example, for steady state conditions, the revolution speed for motor 100 has reached a constant and there are no dynamic changes associated with the operation of motor 100.

The phases of the voltages (and/or the currents) are then recorded for detector trip points (S1206). For example, with reference to FIG. 5, for detector 402, processor 520 configures multiplexer 516 for selecting signal 536. Furthermore, processor 520 configures multiplexer 514 to select signal 528 associated with driving first leg 112. When processor 520 detects a trip point via signal 542, processor 520 determines phase information via signal 548. Processor 520 stores received information for later retrieval.

The amplitudes of the driving signals are then modified (S1208). For example, typically, the amplitude of the driving signals is increased in order to prevent the driving voltage from dropping below the back EMF voltage. The amplification of amplifiers 508, 510 and 512 are modified via signal 521 originating from processor 520. As a result, the amplitude of signals 528, 530 and 532 are modified.

The motor is then allowed to reach a steady state condition (S1210). For example, for steady state conditions, the revolution speed for motor 100 has reached a constant and there are no dynamic changes associated with the operation of motor 100.

The phases of the voltages (or the currents) then are recorded for detector trip points (S1212). For example, similar to that described above, for detector 402, processor 520 configures multiplexer 516 for selecting signal 536. Furthermore, processor 520 configures multiplexer 514 to select signal 528 associated with driving first leg 112. When processor 520 detects a trip point via signal 542, processor determines phase information via signal 548. Processor 520 stores received information for later retrieval.

Calculations are then performed for optimal drive signal phases with the results being stored for later retrieval (S1214). For example, calculations are performed as described with reference to FIGS. 8-11.

It is then determined whether the calibration process is to be repeated (S1216).

If the calibration process is to be repeated, then power is applied to the motor (S1202) and the process repeats.

If the calibration process is not to be repeated, then the final calculated phase information is used to adjust the phases of the driving signals (S1218). For example, processor 520 adjusts the phases of drivers 502, 504 and 506 based on the phase information determined from the calculations performed and stored previously. As a result of the phase adjustments, the signals applied to first leg 112, second leg 114 and third leg 116 enable efficient operation of motor 100. Method 1200 then stops (S1220).

FIG. 12 illustrates an example method for determining the location of detectors for improving the operation of a motor by driving the motor at varying voltages and speeds for determining an amount of phase shift to apply to the driving signals such that the motor operates efficiently.

In accordance with another aspect of the present invention, phase measurements of a sensor may be averaged over many revolutions. In particular, a motor may have hundreds of revolutions per minute. As such, a detector system in accordance with an aspect of the present invention may determine hundreds of slightly different sensor locations, corresponding to the hundreds of revolutions. Accordingly, the plurality of determined locations may be used to calculate and average location of a sensor, wherein the single averaged location is likely a better approximation of the actual location of the sensor.

In accordance with another aspect of the present invention, a phase may be measured for a sensor at a plurality of speeds. A curve may then be fit to the measured phase-vs-speed. Once determined, an optimal phase may be determined from the fitted curve. Furthermore, a motor may behave differently for the different rotations. Accordingly, this optimization measured phase-vs-speed curve may be performed for each sensor in each direction of rotation.

In accordance with another aspect of the present invention, motor may be driven at many speeds and corresponding sensor signals may be detected. The detected sensor signals may be used to derive a look-up table. The look-up table may then be used to interpolate sensor signals, and thereby corresponding sensor positions, based on additional driving speeds.

In accordance with another aspect of the present invention, a motor may be driven at many speeds and corresponding sensor signals may be detected. A least-squares fit of the speed-dependent data may then be used to estimate motor electrical parameters.

The positioning of sensors in a motor is not exact and their angle with respect to the stator is subject to some misalignment. There is also variation in how far apart the separate sensors are spaced, which may not be exactly 120° (in a three-phase motor). These inaccuracies contribute to non-ideal drive conditions which reduce efficiency, speed and power available from the motor. It is possible to adjust the drive signal to match the actual phase of the rotor if it is known precisely. Sometimes a high-resolution shaft encoder is used for this purpose.

The present invention determines sensor positions by driving the motor at two different speeds and does not observe the back-EMF. It therefore has no need for the necessity of being able to disconnect the drive signal, nor have the inputs to measure the back-EMF.

Contrary to the present invention, in a conventional system, the hall sensor alignment is normally performed by spinning the motor with an external mechanical force and observing the phase of the back-EMF on the stator windings with respect to the hall sensors. When operated as a motor, the back-EMF is not usually directly observable because a voltage is being applied to the stator windings that would interfere with the measurement. With the conventional system however, the precise location of the hall sensors could be determined by observing the back-EMF of a spinning, but unpowered motor.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method of monitoring a motor having a stator, a rotor and a detector, the stator being operable to receive a driving signal to produce a first magnetic field, the rotor being operable to rotate in a circle, the rotor having a magnetic portion operable to emit a second magnetic field in a radial direction, the detector being operable to output a detection signal based on the position of the rotor, said method comprising:
   driving the motor with the driving signal such that the driving signal has a first amplitude;
   monitoring the detection signal;
   determining a first rotor angle $\theta_1$ of the rotor relative to the stator based on the driving signal having the first amplitude and the detection signal;
   driving the motor with the driving signal such that the driving signal has a second amplitude;
   monitoring the detection signal;
   determining a second rotor angle $\theta_2$ of the rotor relative to the stator based on the driving signal having the second amplitude and the detection signal; and
   determining the alignment of the detector relative to the stator based on the first rotor angle $\theta_1$ and the second rotor angle $\theta_2$.

2. The method of claim 1, wherein said determining the alignment of the detector relative to the stator based on the first rotor angle $\theta_1$ and the second rotor angle $\theta_2$ comprises determining the alignment of the detector relative to the stator additionally based on the first amplitude and the second amplitude.

3. The method of claim 2, wherein said determining the alignment of the detector relative to the stator additionally based on the first amplitude and the second amplitude comprises determining the alignment of the detector relative to the stator additionally based on a ratio of the first amplitude and the second amplitude.

4. The method of claim 3, wherein said determining the alignment of the detector relative to the stator additionally based on a ratio of the first amplitude and the second amplitude comprises determining the alignment of the detector relative to the stator additionally based on $$\tan^{-1}[[(V_2/V_1)\cos\theta_2 - \cos\theta_1]/[\sin\theta_1 - (V_2/V_1)\sin\theta_2]]$$

wherein $V_1$ is the first amplitude, and
   wherein $V_2$ is the second amplitude.

5. The method of claim 4, wherein said driving the motor with the driving signal such that the driving signal has a first amplitude comprises driving the motor such that the rotor is disposed around the stator and the rotor rotates around the stator.

6. The method of claim 5,
   wherein said driving the motor such that the rotor is disposed around the stator and the rotor rotates around the stator comprises driving the motor such that the rotor is disposed around the stator, which includes a first leg, a second leg and a third leg, and such that the driving signal is provided to the first leg,
   wherein said determining a first rotor angle $\theta_1$ of the rotor relative to the stator based on the driving signal having the first amplitude and the detection signal comprises determining the first rotor angle $\theta_1$ of the rotor relative to the first leg of the stator based on the driving signal having the first amplitude and the detection signal,
   wherein said driving the motor with the driving signal such that the driving signal has a second amplitude comprises driving the motor such that the driving signal is provided to the first leg,
   wherein said determining a second rotor angle $\theta_2$ of the rotor relative to the stator based on the driving signal having the second amplitude and the detection signal comprises determining the second rotor angle $\theta_2$ of the rotor relative to the first leg of the stator based on the driving signal having the second amplitude and the detection signal, and
   wherein said determining the alignment of the detector relative to the stator based on the first rotor angle $\theta_1$ and the second rotor angle $\theta_2$ comprises determining the alignment of the detector relative to the first leg of the stator based on the first rotor angle $\theta_1$ and the second rotor angle $\theta_2$.

7. The method of claim 4, wherein said driving the motor with the driving signal such that the driving signal has a first amplitude comprises driving the motor such that the rotor is disposed around the stator and the rotor rotates around the stator.

8. The method of claim 3, wherein said driving the motor with the driving signal such that the driving signal has a first amplitude comprises driving the motor such that the rotor is disposed around the stator and the rotor rotates around the stator.

9. The method of claim 2, wherein said driving the motor with the driving signal such that the driving signal has a first amplitude comprises driving the motor such that the rotor is disposed around the stator and the rotor rotates around the stator.

10. The method of claim 1, wherein said driving the motor with the driving signal such that the driving signal has a first amplitude comprises driving the motor such that the rotor is disposed around the stator and the rotor rotates around the stator.

11. A non-transitory computer-readable media having computer-readable instructions stored thereon, the computer-readable instructions being capable of being read by a computer to be used for monitoring a motor having a stator, a rotor and a detector, the stator being operable to receive a driving signal to produce a first magnetic field, the rotor being operable to rotate in a circle, the rotor having a magnetic portion operable to emit a second magnetic field in a radial direction, the detector being operable to output a detection signal based on the position of the rotor, the computer-readable instructions being capable of instructing the computer to perform the method comprising:
   driving the motor with the driving signal such that the driving signal has a first amplitude;
   monitoring the detection signal;
   determining a first rotor angle $\theta_1$ of the rotor relative to the stator based on the driving signal having the first amplitude and the detection signal;
   driving the motor with the driving signal such that the driving signal has a second amplitude;
   monitoring the detection signal;
   determining a second rotor angle $\theta_2$ of the rotor relative to the stator based on the driving signal having the second amplitude and the detection signal; and determining the alignment of the detector relative to the stator based on the first rotor angle $\theta_1$ and the second rotor angle $\theta_2$.

12. The non-transitory computer-readable media of claim 11, the computer-readable instructions being capable of instructing the computer to perform said method wherein said determining the alignment of the detector relative to the stator based on the first rotor angle $\theta_1$ and the second rotor angle $\theta_2$ comprises determining the alignment of the detector relative to the stator additionally based on the first amplitude and the second amplitude.

13. The non-transitory computer-readable media of claim 12, the computer-readable instructions being capable of instructing the computer to perform said method wherein said determining the alignment of the detector relative to the stator additionally based on the first amplitude and the second amplitude comprises determining the alignment of the detector relative to the stator additionally based on a ratio of the first amplitude and the second amplitude.

14. The non-transitory computer-readable media of claim 13, the computer-readable instructions being capable of instructing the computer to perform said method
wherein said determining the alignment of the detector relative to the stator additionally based on a ratio of the first amplitude and the second amplitude comprises determining the alignment of the detector relative to the stator additionally based on $\tan^{-1}[[(V_2/V_1)\cos\theta_2 - \cos\theta_1]/[\sin\theta_1 - (V_2/V_1)\sin\theta_2]]$ wherein $V_1$ is the first amplitude, and
wherein $V_2$ is the second amplitude.

15. The non-transitory computer-readable media of claim 14, the computer-readable instructions being capable of instructing the computer to perform said method wherein said driving the motor with the driving signal such that the driving signal has a first amplitude comprises driving the motor such that the rotor is disposed around the stator and the rotor rotates around the stator.

16. The non-transitory computer-readable media of claim 15, the computer-readable instructions being capable of instructing the computer to perform said method
wherein said driving the motor such that the rotor is disposed around the stator and the rotor rotates around the stator comprises driving the motor such that the rotor is disposed around the stator, which includes a first leg, a second leg and a third leg, and such that the driving signal is provided to the first leg,
wherein said determining a first rotor angle $\theta_1$ of the rotor relative to the stator based on the driving signal having the first amplitude and the detection signal comprises determining the first rotor angle $\theta_1$ of the rotor relative to the first leg of the stator based on the driving signal having the first amplitude and the detection signal,
wherein said driving the motor with the driving signal such that the driving signal has a second amplitude comprises driving the motor such that the driving signal is provided to the first leg,
wherein said determining a second rotor angle $\theta_2$ of the rotor relative to the stator based on the driving signal having the second amplitude and the detection signal comprises determining the second rotor angle $\theta_2$ of the rotor relative to the first leg of the stator based on the driving signal having the second amplitude and the detection signal, and
wherein said determining the alignment of the detector relative to the stator based on the first rotor angle $\theta_1$ and the second rotor angle $\theta_2$ comprises determining the alignment of the detector relative to the first leg of the stator based on the first rotor angle $\theta_1$ and the second rotor angle $\theta_2$.

17. The non-transitory computer-readable media of claim 14, the computer-readable instructions being capable of instructing the computer to perform said method wherein said driving the motor with the driving signal such that the driving signal has a first amplitude comprises driving the motor such that the rotor is disposed around the stator and the rotor rotates around the stator.

18. The non-transitory computer-readable media of claim 13, the computer-readable instructions being capable of instructing the computer to perform said method wherein said driving the motor with the driving signal such that the driving signal has a first amplitude comprises driving the motor such that the rotor is disposed around the stator and the rotor rotates around the stator.

19. A method of monitoring a motor having a stator, a rotor and a detector, the stator being operable to receive a driving signal to produce a first magnetic field, the rotor being operable to rotate in a circle in response to the first magnetic field, the rotor having a magnetic portion operable to emit a second magnetic field in a radial direction, the detector being operable to output a detection signal based on the position of the rotor, said method comprising:
driving the motor with the driving signal such that the first driving signal has a first amplitude and a first frequency causing a first speed of rotation of said rotor;
monitoring the detection signal;
determining a first rotor angle $\theta_1$ of the rotor relative to the stator based on the driving signal having the first amplitude and first frequency and the detection signal;
driving the motor with the driving signal such that the driving signal has a second amplitude and the first frequency;
monitoring the detection signal;
determining a second rotor angle $\theta_2$ of the rotor relative to the stator based on the driving signal having the second amplitude and first frequency and the detection signal;
driving the motor with the driving signal such that the driving signal has a third amplitude and a second frequency causing a second speed of rotation of said rotor;
monitoring the detection signal;
determining a third rotor angle $\theta_3$ of the rotor relative to the stator based on the driving signal having the third amplitude and second frequency and the detection signal;
driving the motor with the driving signal such that the driving signal having a fourth amplitude and second frequency;
monitoring the detection signal;
determining a fourth rotor angle $\theta_4$ of the rotor relative to the stator based on the driving signal having the fourth amplitude and second frequency and the detection signal; and
determining the ratio of a winding inductance of the motor to a winding resistance of the motor based on the first rotor angle $\theta_1$, the second rotor angle $\theta_2$, the third rotor angle $\theta_3$ the fourth rotor angle $\theta_4$, the first driving frequency, and the second driving frequency.

* * * * *